(12) United States Patent
Osborne et al.

(10) Patent No.: US 7,114,261 B1
(45) Date of Patent: Oct. 3, 2006

(54) APPARATUS FOR SHAPING A TILE TO CONFORM TO A CONTOUR

(75) Inventors: Joel P. Osborne, Palm Harbour, FL (US); Ernest G. Osborne, Stockbridge, GA (US)

(73) Assignee: Accu-Scribe, LLC, Stockbridge, GA (US)

( * ) Notice: Subject to any disclaimer, the term of this patent is extended or adjusted under 35 U.S.C. 154(b) by 119 days.

(21) Appl. No.: 10/334,930

(22) Filed: Dec. 31, 2002

(51) Int. Cl.
*B43L 13/00* (2006.01)

(52) U.S. Cl. .................. 33/18.1; 33/27.12; 33/41.6; 33/347

(58) Field of Classification Search .......... 33/526–527, 33/18.1, 26, 27.12, 42, 41.1, 41.5, 41.6, DIG. 1, 33/706–708, 347, 613, 645
See application file for complete search history.

(56) References Cited

U.S. PATENT DOCUMENTS

| | | | | |
|---|---|---|---|---|
| 2,409,106 A | * | 10/1946 | Connelly | 33/41.5 |
| 2,557,699 A | * | 6/1951 | Silver | 33/18.1 |
| 2,581,534 A | * | 1/1952 | Hungerford | 33/41.5 |
| 2,594,457 A | * | 4/1952 | Kunzler | 33/21.1 |
| 2,726,451 A | * | 12/1955 | Johnson | 33/23.03 |
| 2,796,665 A | * | 6/1957 | Cossock | 33/23.03 |
| 3,145,475 A | * | 8/1964 | Alford | 33/41.1 |
| 3,775,853 A | * | 12/1973 | Doret et al. | 33/27.03 |
| 4,120,220 A | * | 10/1978 | Mullen | 33/27.01 |
| 4,809,439 A | * | 3/1989 | Burns | 33/42 |
| 5,033,197 A | * | 7/1991 | Irvello | 33/42 |
| 5,253,421 A | * | 10/1993 | Landmark | 33/27.03 |
| 5,651,184 A | * | 7/1997 | Tutty | 33/21.1 |
| 5,842,283 A | * | 12/1998 | Yatsu et al. | 33/706 |
| 5,886,494 A | * | 3/1999 | Prentice et al. | 33/1 M |
| 5,893,255 A | * | 4/1999 | Lee | 33/533 |
| 6,029,360 A | * | 2/2000 | Koch | 33/382 |
| 6,178,649 B1 | * | 1/2001 | Wu | 33/286 |
| 6,305,090 B1 | * | 10/2001 | Julien | 33/41.5 |
| 6,523,272 B1 | * | 2/2003 | Morales | 33/526 |
| 6,578,279 B1 | * | 6/2003 | Moon | 33/481 |
| 6,769,195 B1 | * | 8/2004 | Huber et al. | 33/706 |
| 6,832,864 B1 | * | 12/2004 | Patton et al. | 33/18.1 |
| 6,935,037 B1 | * | 8/2005 | Garcia | 33/526 |
| 2002/0032969 A1 | * | 3/2002 | Cardew | 33/42 |

* cited by examiner

*Primary Examiner*—Yaritza Guadalupe-McCall
(74) *Attorney, Agent, or Firm*—Biddle & Associates, P.C.

(57) ABSTRACT

A scribing device is provided that includes an alignment track, a scribe arm and a coupling unit for coupling the scribe arm to the alignment track at a predetermined angle. The coupling unit is configured to travel along the alignment track in an X direction while allowing the scribe arm to move in the Y direction.

25 Claims, 26 Drawing Sheets

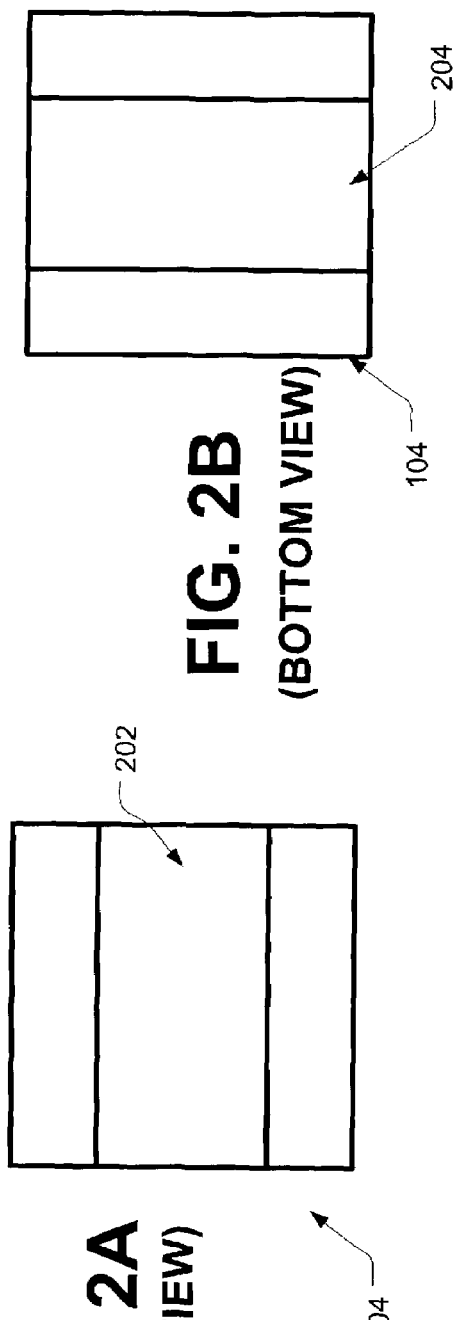
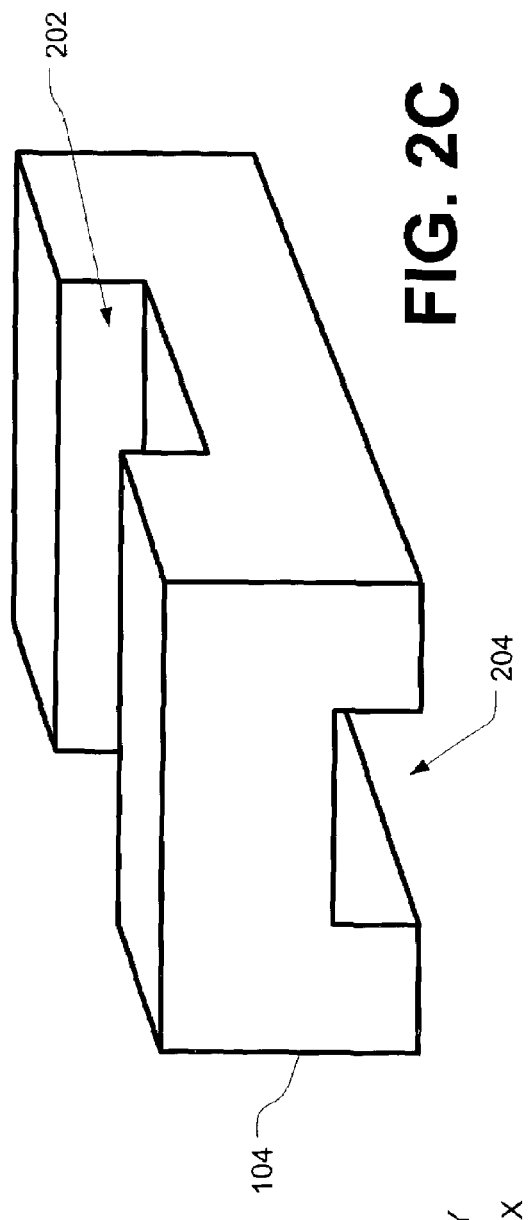
FIG. 2A (TOP VIEW)
FIG. 2B (BOTTOM VIEW)
FIG. 2C

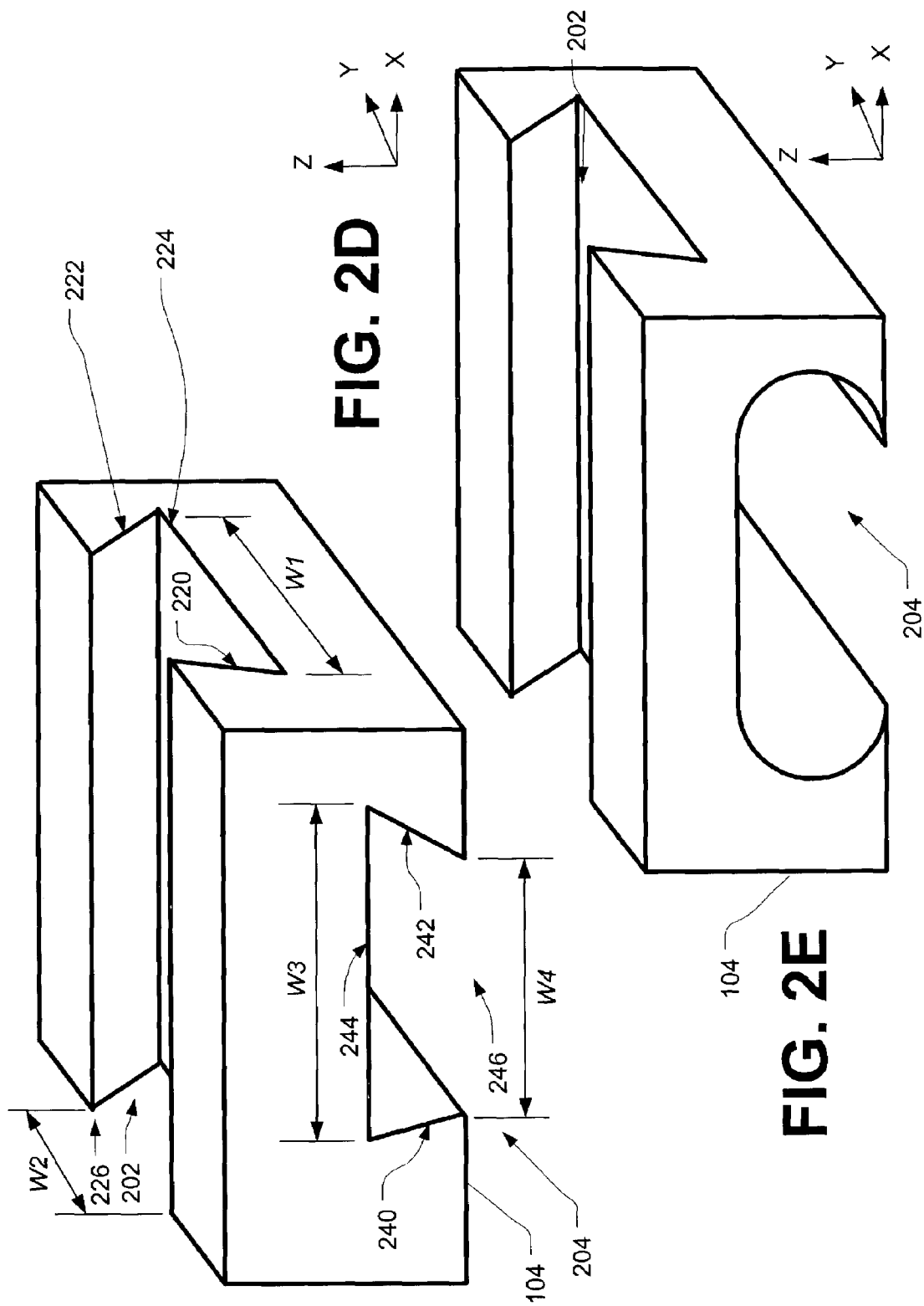

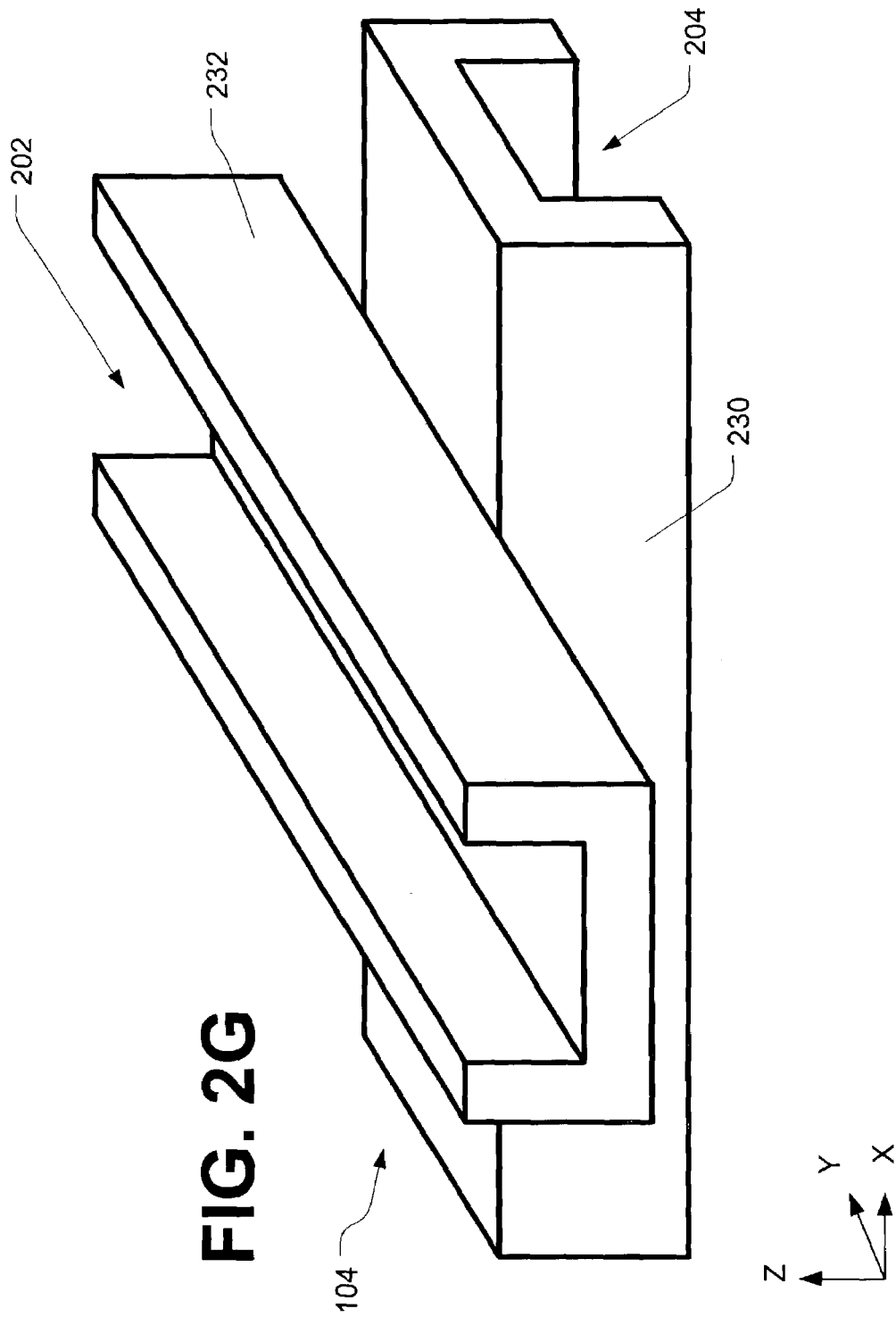

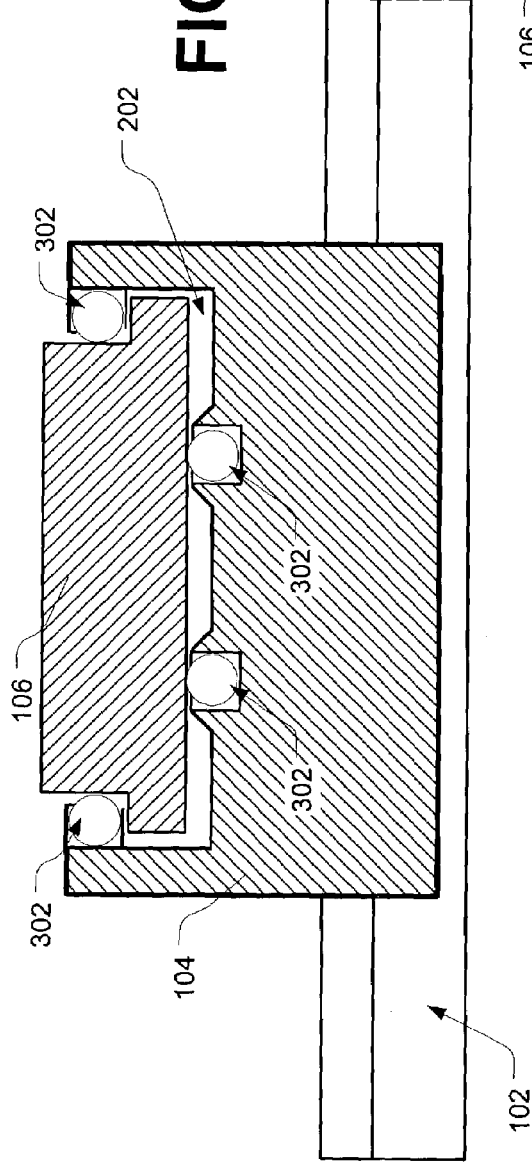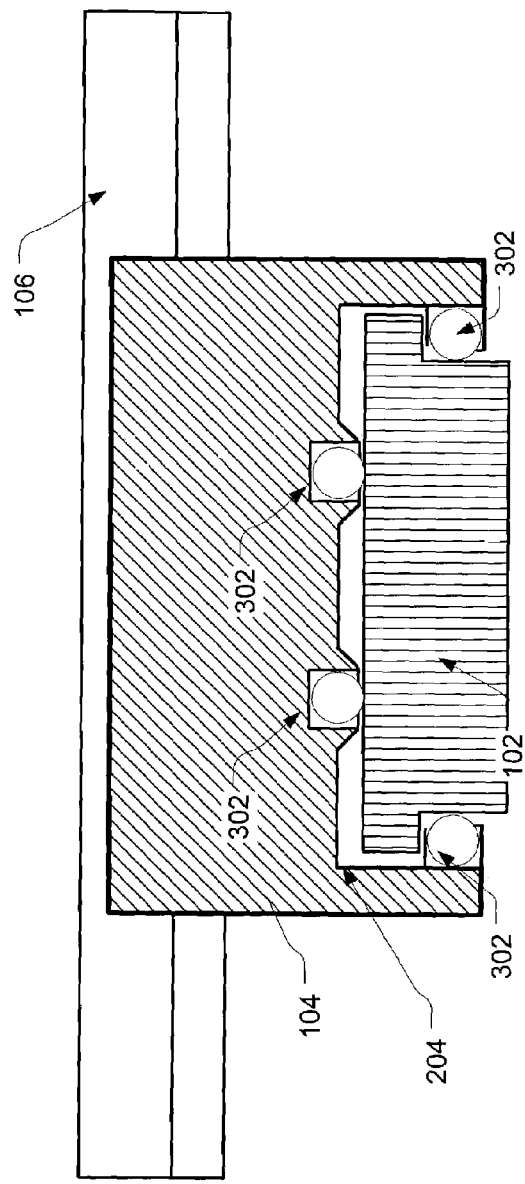

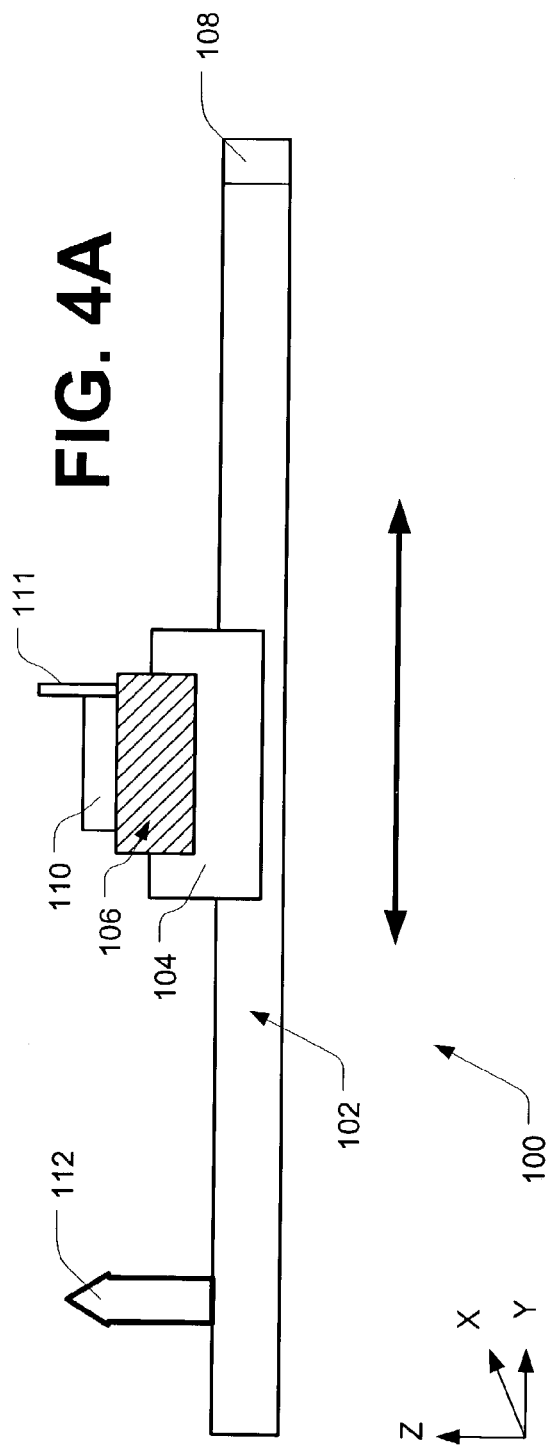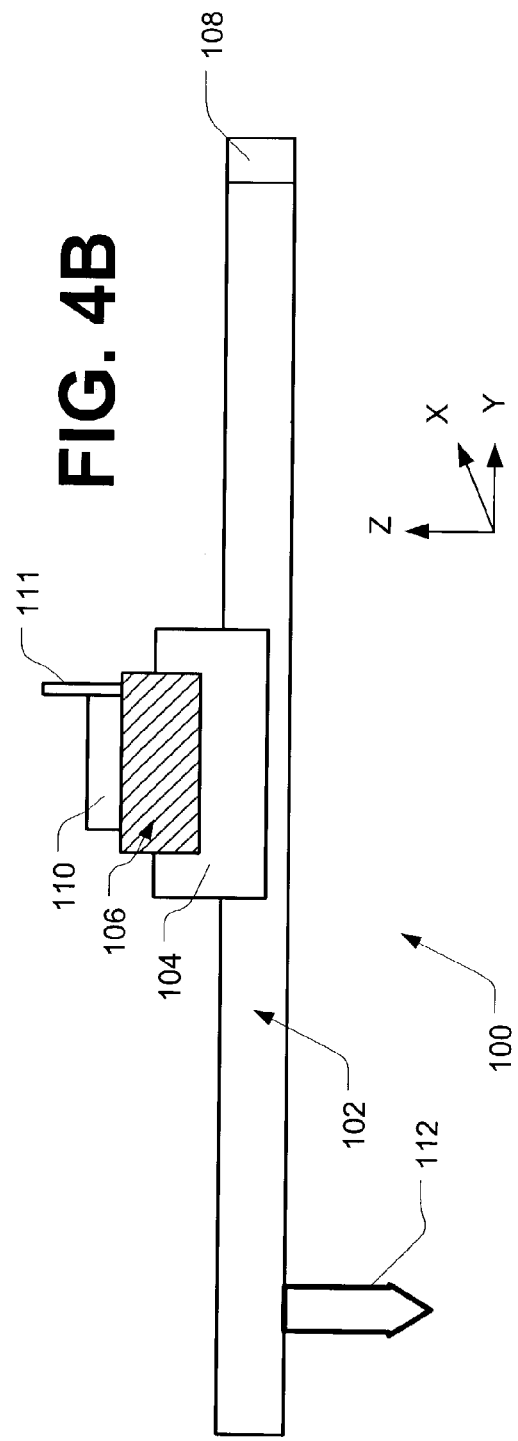

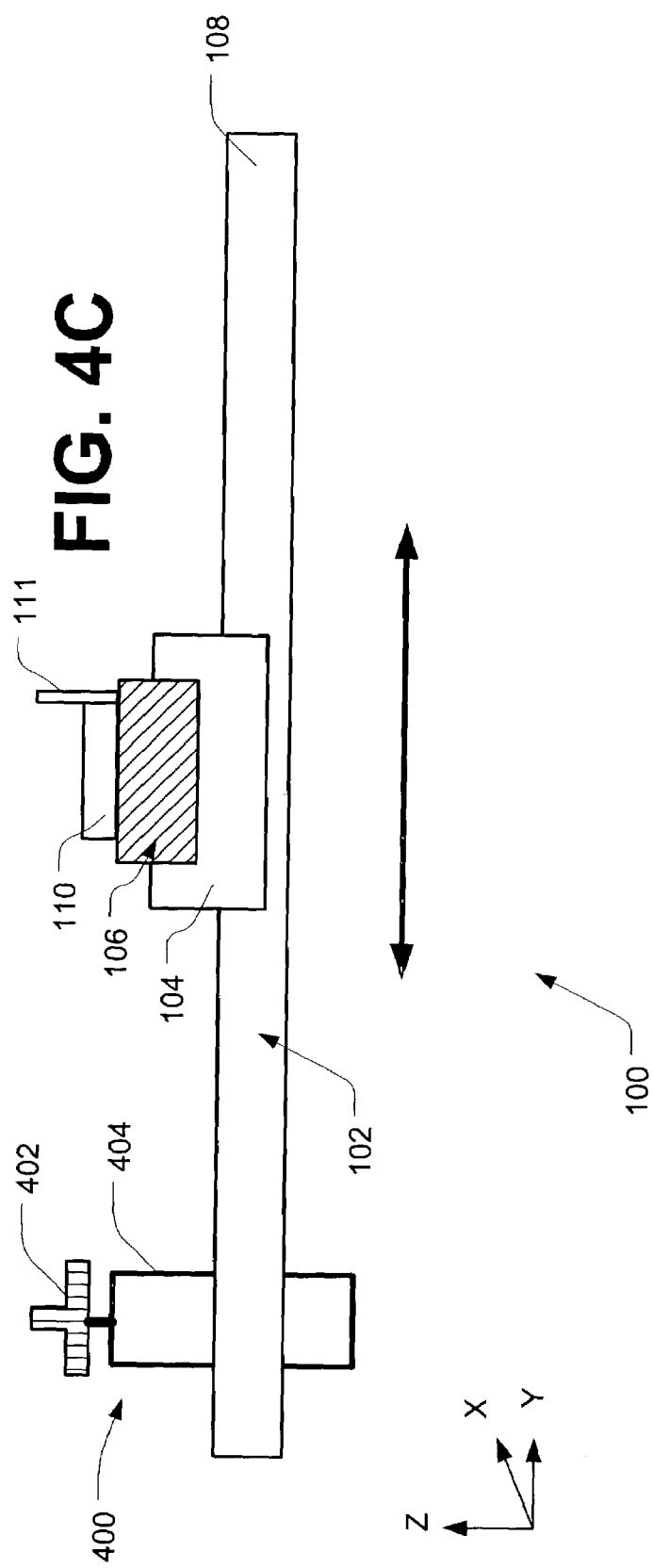

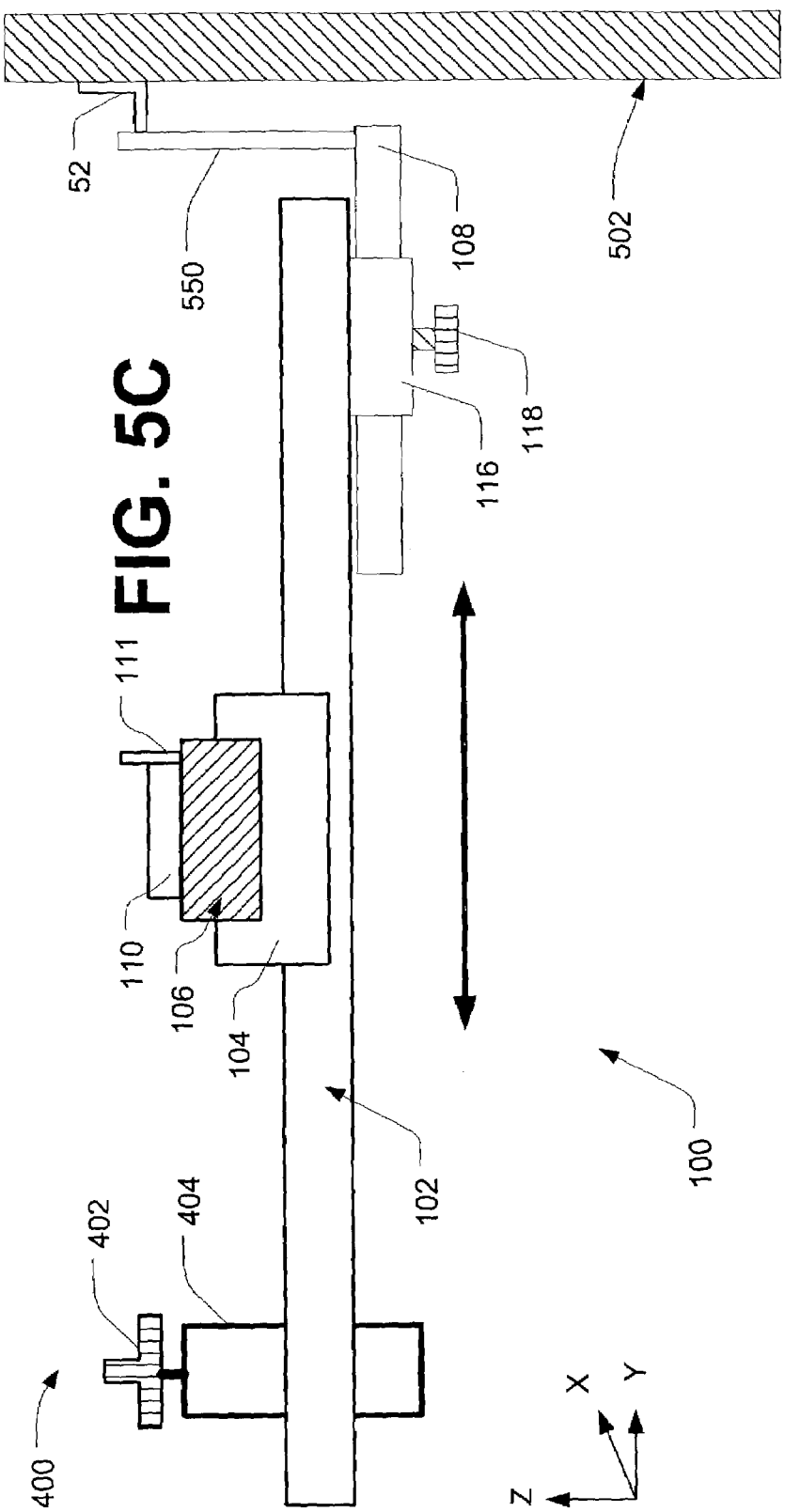

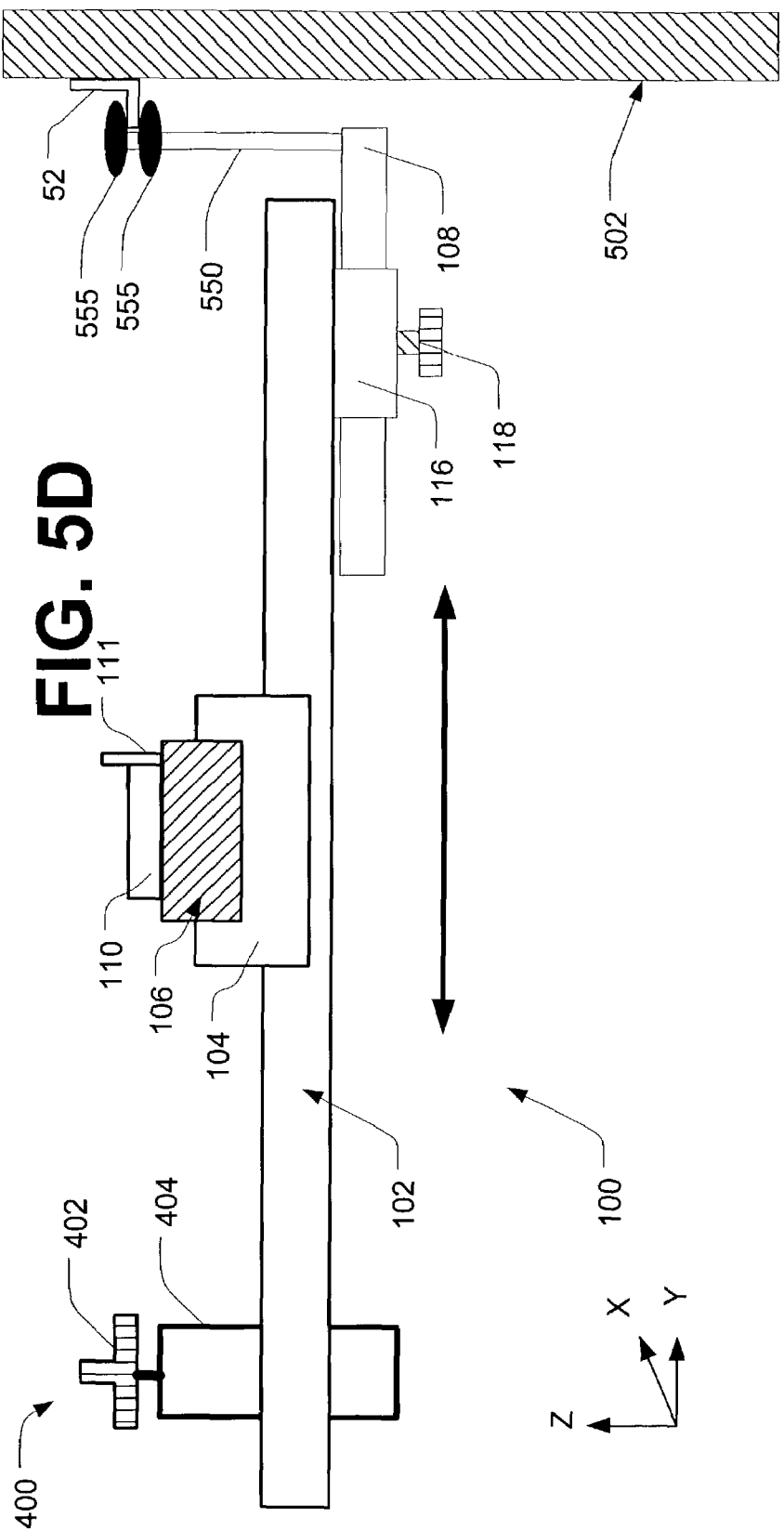

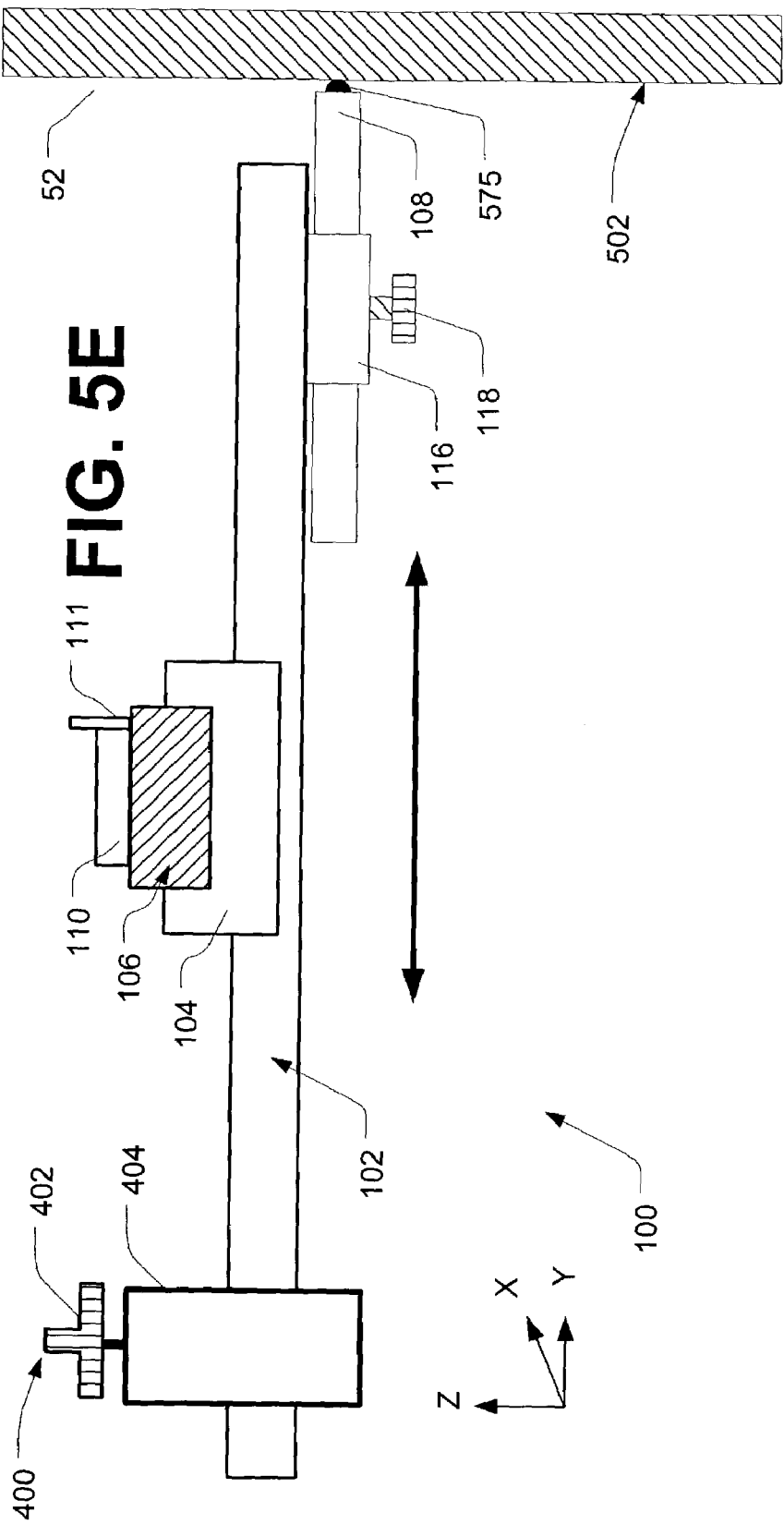

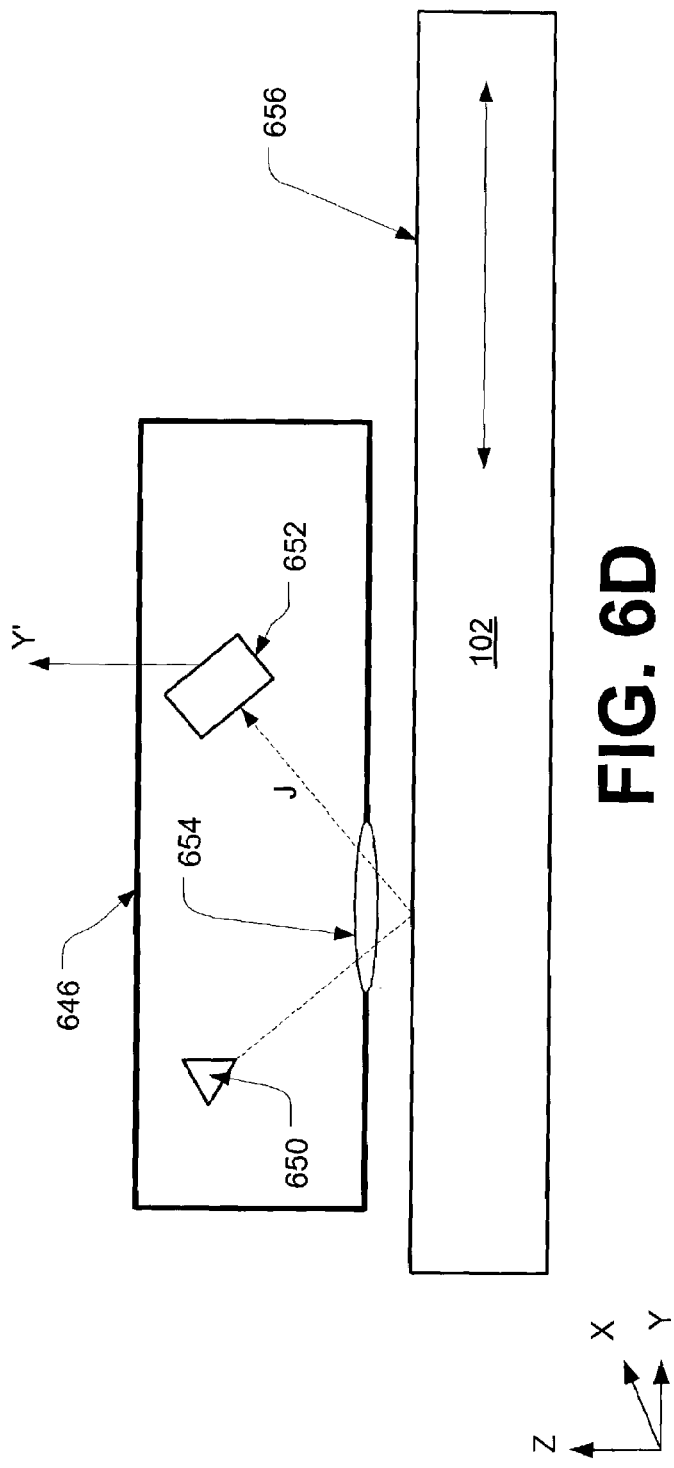
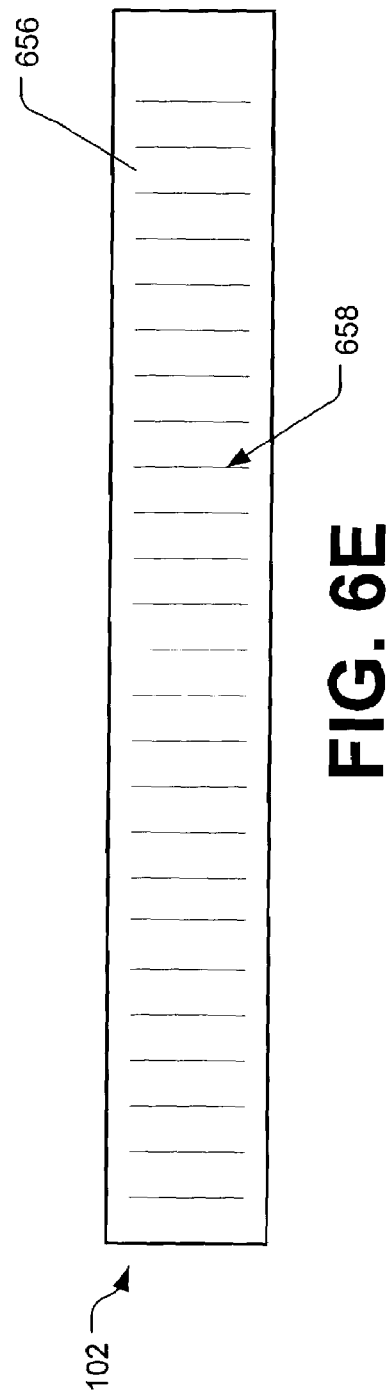
FIG. 6D
FIG. 6E

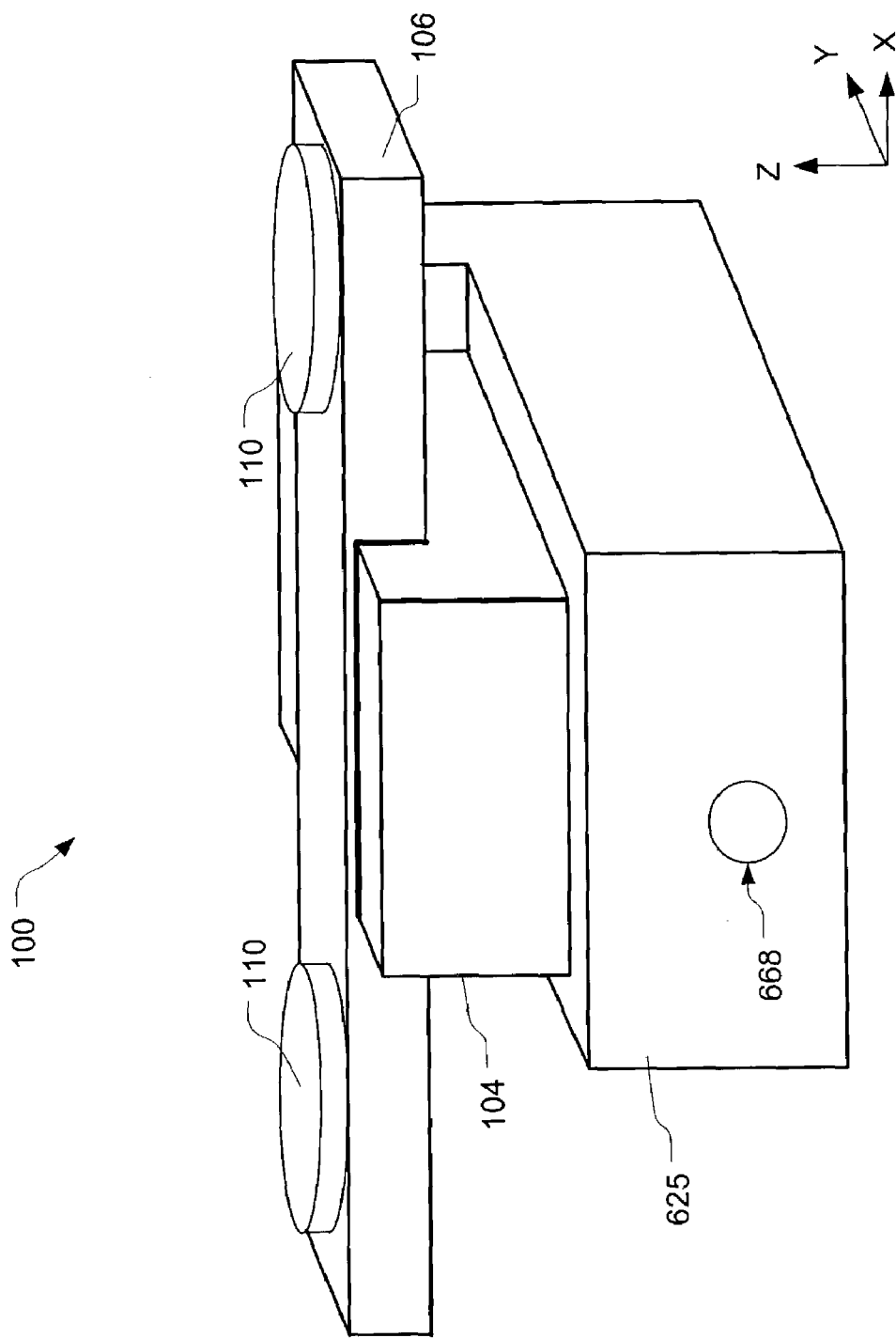

APPARATUS FOR SHAPING A TILE TO CONFORM TO A CONTOUR

TECHNICAL FIELD

The present invention is generally related to shaping tile. More particularly, the present invention is related to a device for shaping tile to conform to the contour of a predetermined edge, such as a wall, partition or other structure.

BACKGROUND OF THE INVENTION

Tile systems are in common use in architecture and building construction. These tile systems include ceramic, stone, porcelain, granite, marble, as well as other types of material for use as tile. These tiles may be used, for example, as floor covering, wall surfaces and/or counter top surfaces. Additionally, there are ceiling tile systems, such as acoustical ceiling tile systems, for use as ceiling or wall surfaces inside buildings or other structures. These ceiling tile systems are commonly referred to as acoustical tile systems.

During installation of tile systems, it is often necessary for certain tiles to be cut or shaped to fit a particular area. Tiles that often must be cut/shaped are those tiles that border or abut a wall or partition that is aligned perpendicularly to the plane in which the tile system is placed. Where the abutting wall or partition is non-linear (or curved), tile must be shaped to conform to the curve of the abutting wall or partition. Shaping is typically carried out on site during the installation process.

The process of shaping a tile to conform to a particular curve typically entails a degree of "guess work" in determining the dimensions and lines of the area in which the tile is to be placed. Based on the determined dimensions and lines, a standard tile will be cut to a shape that conforms to the measured dimensions and lines. While the craftsman with experience can often determine the appropriate dimensions and lines with substantial ease, more complex curves/shapes can tax even the most skilled craftsman. The result is often wasted tile material and time.

Thus, a heretofore unaddressed need exists in the industry to address the aforementioned deficiencies and inadequacies.

SUMMARY OF THE INVENTION

The present invention provides a system and method for shaping a tile to conform to a given contour. Briefly described, in architecture, the system can be implemented as follows. An alignment track is provided. A coupling unit is moveably connected to the alignment track. The coupling unit is further connected to a scribe arm. The coupling unit is configured to hold the scribe arm at a predetermined angle relative to the alignment track. The coupling unit is moveable in the X direction along the alignment track. The scribe arm is moveable in the Y direction.

A further implementation of the system provides for an alignment track. A coupling unit is moveably connected to the alignment track. The coupling unit is further connected to a scribe arm. The coupling unit is configured to hold the scribe arm at a predetermined angle relative to the alignment track. The coupling unit is moveable in the X direction along the alignment track. The scribe arm is moveable in the Y direction. A position sensor unit is provided for detecting the position of the scribe arm in the X direction and in the Y direction, and outputting a signal representative of the position of the scribe arm.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A, 2B, 2C, 2D, 2E are illustrations showing various embodiments of coupling unit 104;

FIG. 2G is a diagram illustrating a further embodiment of coupling unit 104;

FIG. 3A and FIG. 3B are diagrams illustrating details of a further embodiment of channels 202 and 204 of coupling unit 104;

FIG. 4A, FIG. 4B and FIG. 4C are illustrations showing further embodiments of scribe device 100;

FIG. 5C is a diagram illustrating an embodiment of guide 108 configured to include a guide riser 550;

FIG. 5D is a diagram illustrating an embodiment of guide riser 550 configured to include rollers 555;

FIG. 5E is a diagram illustrating an embodiment of guide 108 configured to include a roller ball tip 575;

FIG. 6D is a diagram illustrating an embodiment of an optical encoder 646;

FIG. 6E is a diagram illustrating an embodiment of a scribe arm 102 in which a surface of the scribe arm 102 includes a series of predetermined index marks 658;

FIG. 6G is a diagram further illustrating the embodiment of scribe device 100 shown in FIG. 6F;

DETAILED DESCRIPTION OF THE PREFERRED EMBODIMENT

Figure 1A:
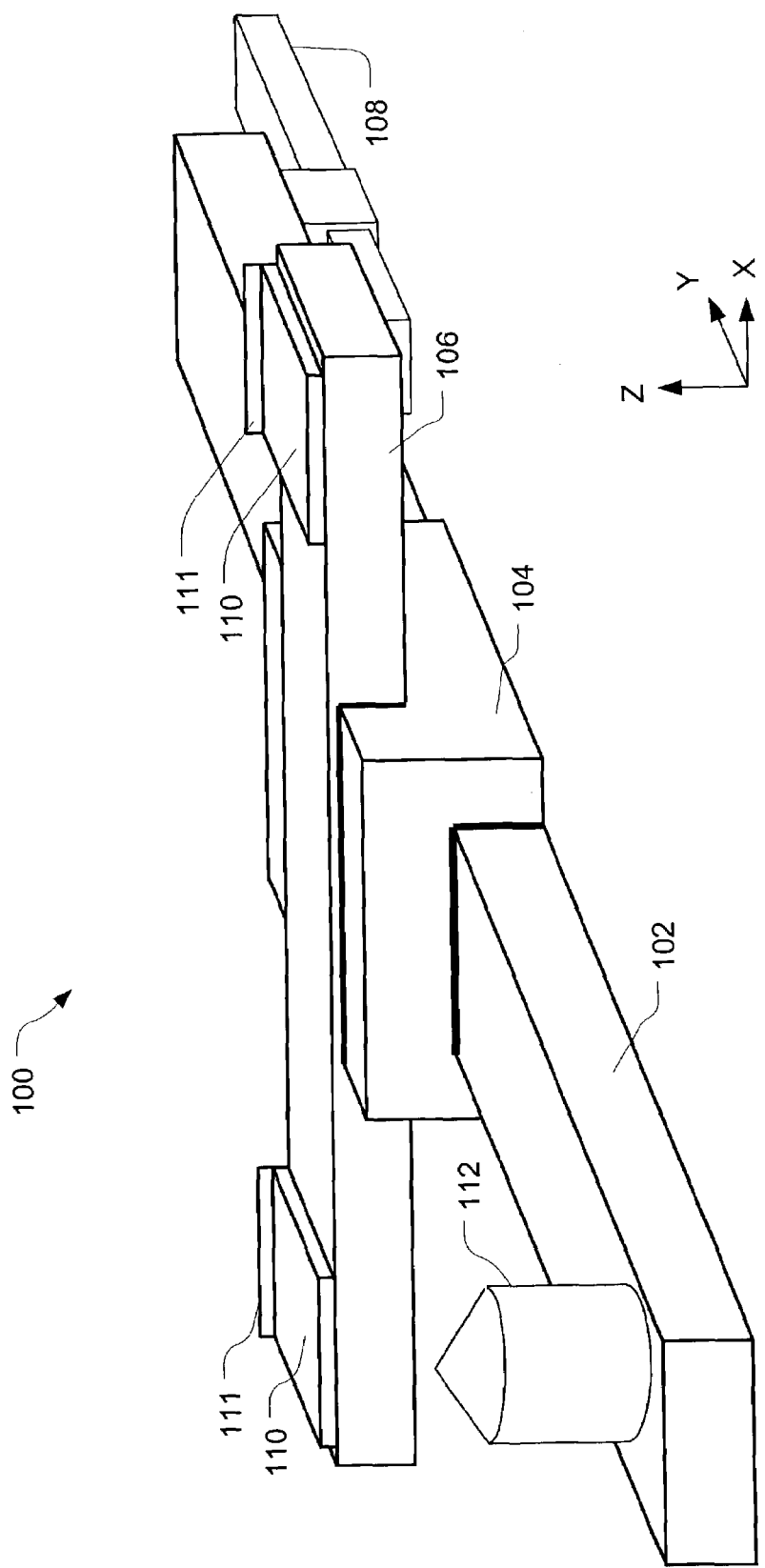
FIG. 1A is an illustration of a preferred embodiment of a scribing device 100 according to the invention.

FIG. 1A shows a preferred embodiment of the scribing device 100. In this embodiment, the scribing device 100 is configured to include a scribe arm 102, a coupling unit 104 and an alignment track 106. Alignment track 106 is coupled to scribe arm 102 via coupling unit 104. Coupling unit 104 is preferably configured to moveably couple the scribe arm 102 with the alignment track 106. Further, the coupling unit 104 is configured to maintain a predetermined angle R (FIG. 1B) between the alignment track 106 and the scribe arm 102.

Scribe arm 102 is configured to include a guide 108 for interfacing with a structure to which a tile may need to be shaped to conform with. The scribe arm 102 may also include a scribe interface 112 for securing a scoring device to etch/score or otherwise mark a tile. The scribe interface 112 may also be configured to as a cutter device for cutting or routing a tile to shape.

Alignment track 106 is configured to include fasteners 110 for securing the alignment track to a support structure, such as a support frame for a ceiling tile system. In a preferred embodiment, the fasteners 110 are magnets. Alignment stops 111 are provided to prevent the alignment track 106 from being displaced from a support structure to which it is aligned or affixed. The configuration of the alignment stops 111 is further illustrated in FIG. 5A.

Figure 1B:
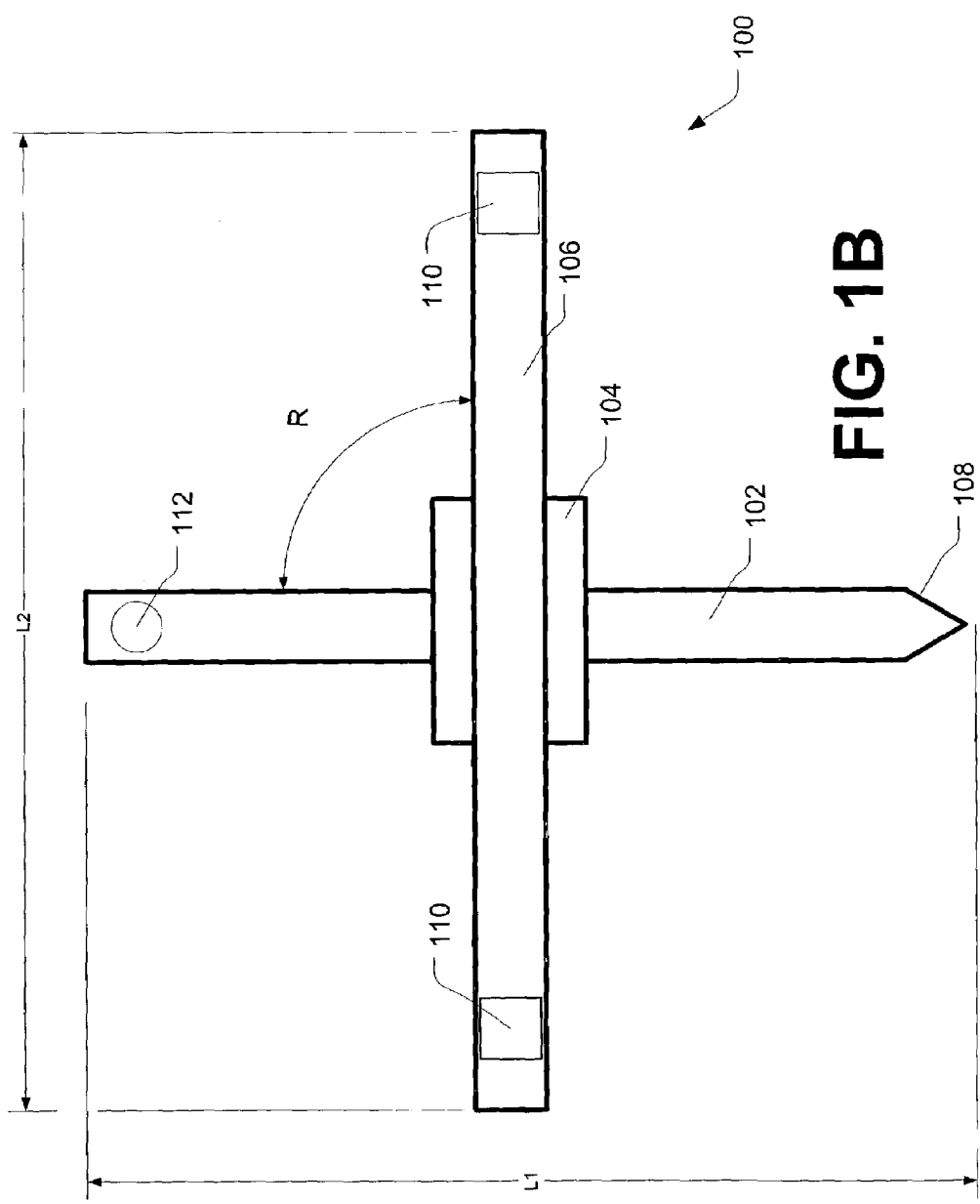
FIG. 1B is a further illustration of the scribing device 100 of FIG. 1A.

FIG. 1B shows a further illustration of shaping device 100. The scribe arm 102 has a length L1, while the alignment track 106 has a length L2. In a preferred embodiment, the length L1 of the scribe arm 102 is 24 inches while the length L2 of the alignment track 106 is 48 inches. It will be recognized that the length L1 of the scribe arm 102 may be any length as desired or otherwise appropriate for a given situation. Further, it will similarly be recognized that the length L2 of the alignment track 106 may be any length as desired or otherwise appropriate for a given situation. The coupling unit 104 is configured to maintain a predetermined angle R between the alignment track 106 and the scribe arm 102. In a preferred embodiment, the coupling unit 104 is configured to maintain approximately a 90° angle between the scribe arm 102 and the alignment track 106.

Figure 1C:
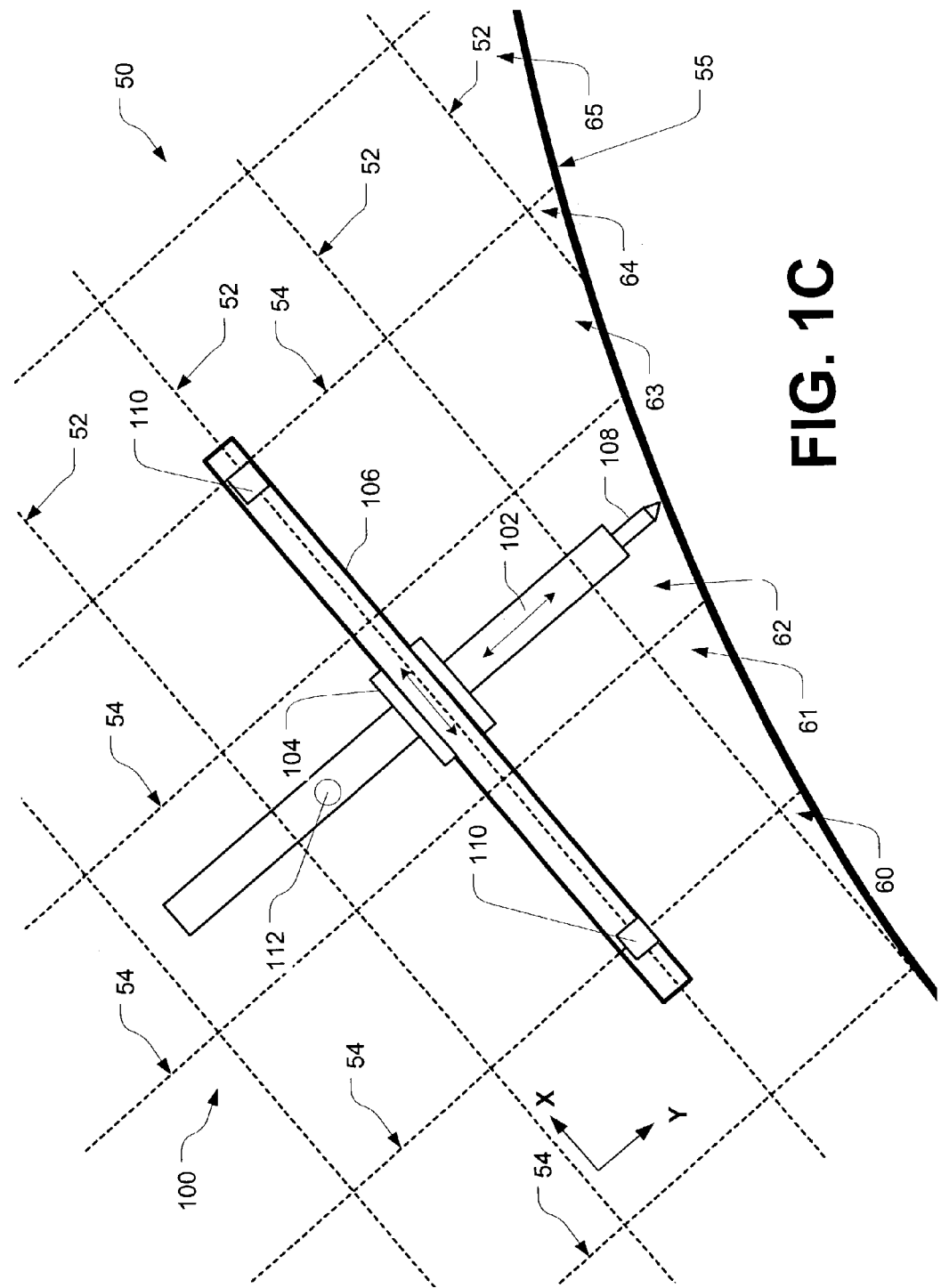
FIG. 1C is a top view diagram illustrating the scribing device 100 of FIG. 1A and FIG. 1B attached to a ceiling tile support structure 50.

FIG. 1C shows a diagram illustrating the shaping device 100 of FIG. 1A and FIG. 1B attached to a ceiling tile support structure 50. The support structure 50 is made up of a first set of cross members 52 that are aligned perpendicular to a second set of cross members 54 thus forming a grid. In this example, the cross members 52 and 54 form a series of squares that can accommodate a standard square shaped ceiling tile. The exceptions to this are those areas 60, 61, 62, 63, 64 and 65 that directly abut the curved wall structure 55. This illustration shows that the support structure 50 abuts a wall structure 55. In this example, wall structure 55 is a curved structure. In the case of these areas, the tile must be shaped to conform to the shape bounded by the relevant cross members 52 and 54 and a curved wall structure 55. This illustration shows a top down view. The shaping device 100 is attached to a cross member 52 of support structure 50 via the fasteners 110. In this example, the alignment track 106 is held in a position that is substantially parallel to the cross members 52.

The coupling unit 104 is connected to the alignment track 106 and is freely moveable along the alignment track in the X direction. The coupling unit 104 further connects to the scribe arm 102. In this example, the coupling unit 104 holds the scribe arm 102 at an angle substantially 90° relative to the alignment track 106. Scribe arm 102 is freely along a path in the Y direction.

Figure 1D:
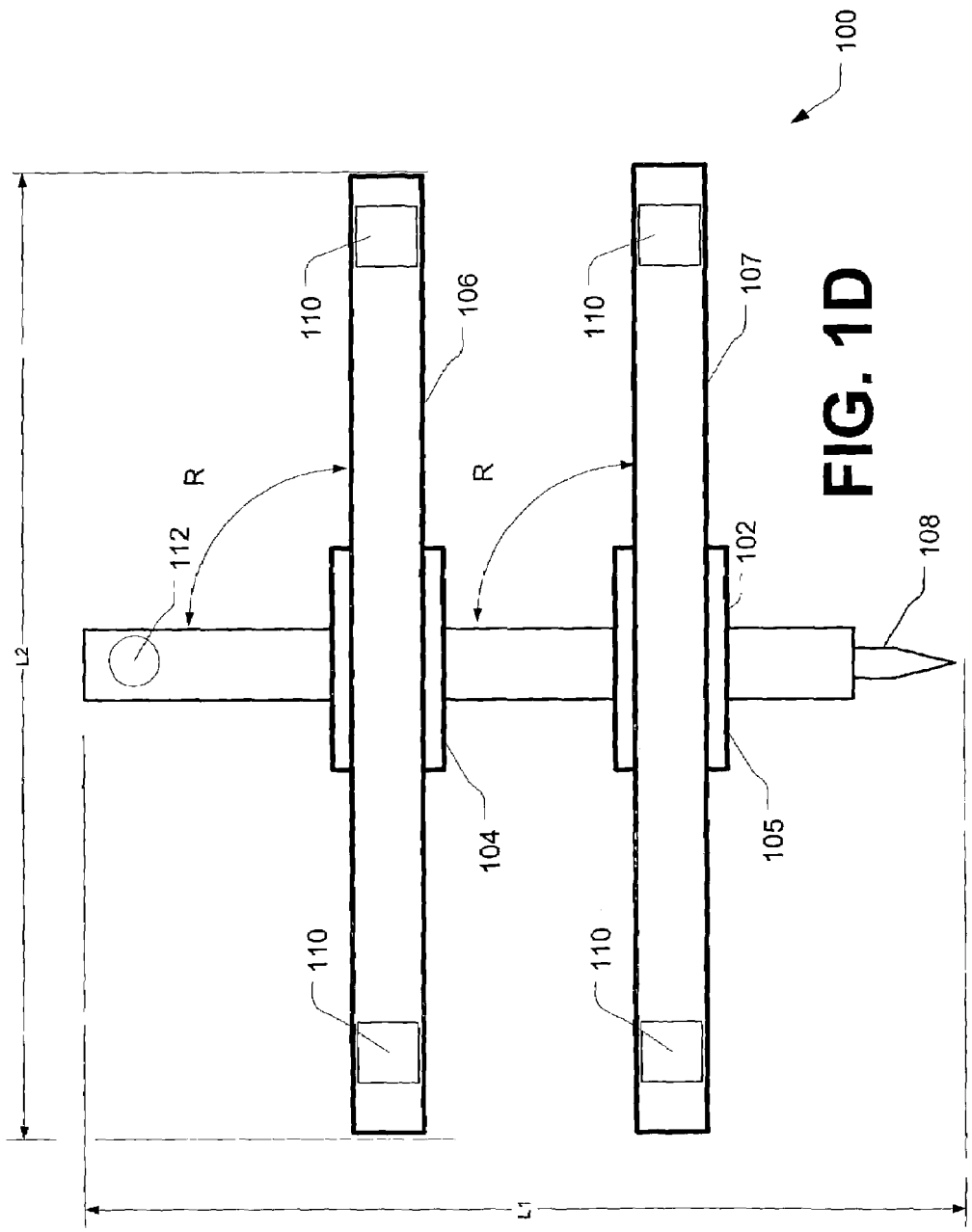
FIG. 1D is a diagram illustrating a further embodiment of scribing device 100 wherein an alignment track 106 and an alignment track 107 are incorporated.

FIG. 1D is a diagram illustrating a further embodiment of scribing device 100. In this embodiment, a second alignment track 107 is provided. Alignment track 107 is preferably secured to the scribe arm 102 via a coupling unit 105. Coupling unit 105 is preferably configured like coupling unit 104, however it is not necessary that these coupling units be identical, as long as they both act to support the scribe arm 102 at a predetermined angle in relation to the alignment tracks 104 and 105.

FIG. 2A and FIG. 2B show a diagram further illustrating an embodiment of coupling unit 104. FIG. 2A is a top view and shows that the coupling unit 104 may be configured to provide for a channel 202 for receiving the alignment track 106 (not shown). FIG. 2B is a bottom view that shows that the coupling unit 104 may be configured to provide for a channel 204 configured to receive the scribe arm 102 (not shown). FIG. 2C is a view showing the relation of channel 202 and channel 204 of the coupling unit 104. In this example, the channels 202 and 204 are aligned substantially perpendicular to each other. It will be recognized, however, that the coupling unit 104 may also be configured so that channels 202 and 204 are aligned at another predetermined angle relative to each other, as may be desired.

FIG. 2D and FIG. 2E show further examples of how the channels 202 and 204 may be configured. In FIG. 2D, the channel 202 is "dovetailed" so as to include two walls 220 and 222 that are angled inward to a channel floor 224 from an opening 226. The channel floor 224 width W1 of the channel floor 224 is wider than the width W2 of opening 226. As a result, the channel walls 220 and 222 act to limit a similarly shaped member that is received in the channel 202 from moving in the Z direction. Similarly, the channel 204 may also be dovetailed so as to include two walls 240 and 242 that are angled inward to a channel floor 244 from an opening 246. The channel floor 244 width W3 of the channel floor 244 is wider than width W4 of the opening 246. As a result, the channel walls 240 and 242 act to limit a similarly shaped member that is received in the channel 204 from moving in the Z direction.

By providing appropriate portions of the alignment track 106 and/or the scribe arm 102 that conform to the shape of the channels 202 and/or 204, the coupling unit 104 may hold the scribe arm 102 in a desired position relative to the alignment track 106.

FIG. 2E shows that the channels 202 and 204 may be configured to accommodate differently shaped members. While each channel 202 and 204 may be configured identically, it is not necessary and it will be recognized that each channel 202 and 204 may be configured differently from each other in order to accommodate the shape and size of respective relevant members.

Figure 2F:
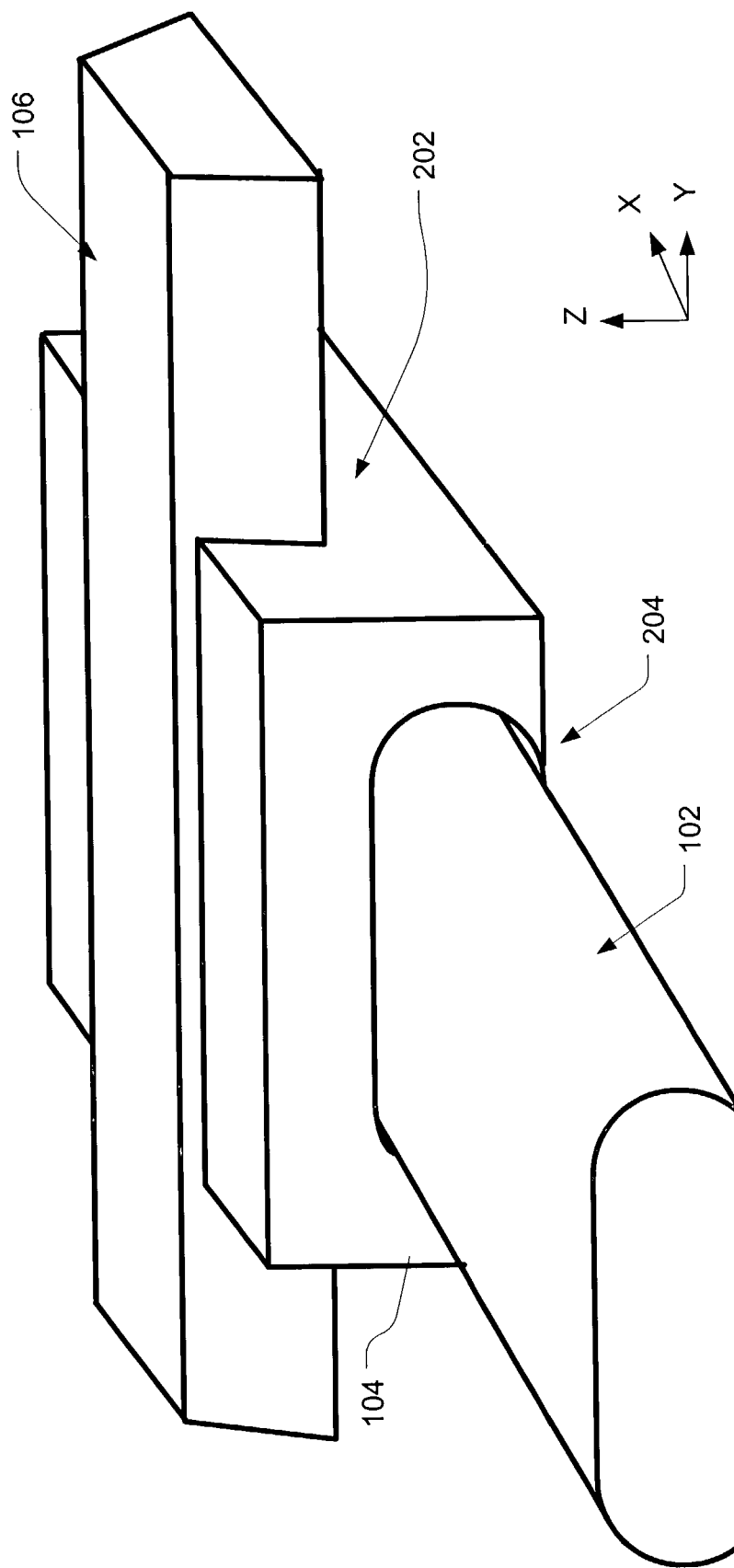
FIG. 2F is an illustration showing a further embodiment of coupling unit 104, scribe arm 102 and alignment track 106.

FIG. 2F is an illustration showing coupling unit 104 that is configured to accommodate an alignment track 106 that has a angled sides in a channel 202 and a scribe arm 106 that has generally rounded sides in a channel 204. It will be recognized that both the scribe arm 102 and the alignment track 106 may be similarly shaped if desired and that the channels 202 and 204 may also be configured to accommodate similarly shaped alignment track 106 and scribe arm 102.

FIG. 2G is a diagram showing a further embodiment of the coupling unit 104. In this embodiment, the coupling unit 104 is configured to provide for cross members 230 and 232. Cross member 230 is configured to provide for a channel 204 while the cross member 232 is configured to provide for a channel 202.

Figure 2H:
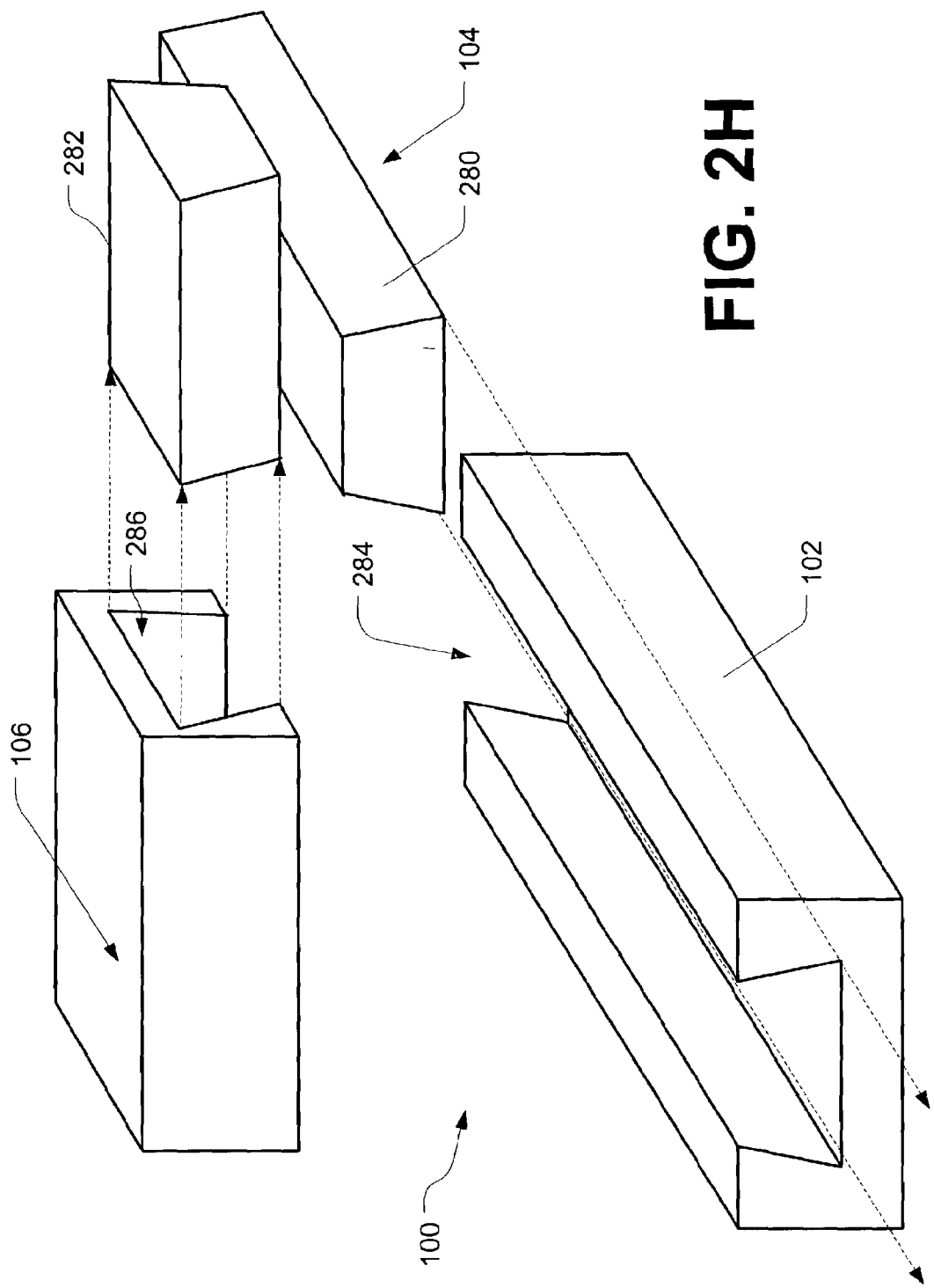
FIG. 2H is a diagram illustrating a further embodiment of coupling unit 104, scribe arm 102 and alignment track 106.

FIG. 2H is a diagram illustrating a further embodiment of the coupling unit 104. In this embodiment, the coupling unit 104 is configured to include a first cross member 280 and a second cross member 282. Coupling unit 104 is configured so that the cross members 280 and 282 are positioned at a predetermined angle relative to each other. In this example, cross member 280 is configured to engage with a channel 284 of scribe arm 102. Similarly, the cross member 282 is configured to engage with a channel 286 of alignment track 106. In this example, it will be noted that both the scribe arm 102 and the alignment track 106 are configured to include channels 284 and 286, respectively. The channels 284 and 286 are preferably dovetailed similar to the channels 202 and 204 of the coupling unit 104 discussed with respect to FIG. 2D above.

FIG. 3A and FIG. 3B show details of a preferred embodiment of channels 202 and 204 of coupling unit 104. FIG. 3A illustrates a cross section showing the channel 202 of coupling unit 104. Channel 202 is configured to receive the alignment track 106 at a predetermined angle relative to the scribe arm 102. The channel 202 is configured to include bearings 302. The bearings 302 are position in the channel 202 so as to make contact with the alignment track 106 and provide for smooth movement of the alignment track 106 through the channel 202.

Similarly, FIG. 3B illustrates a cross section showing the channel 204 of coupling unit 104. Channel 202 is configured to receive the scribe arm 102 at a predetermined angle relative to the alignment track 106. The channel 204 is configured to include bearings 302. The bearings 302 are positioned in the channel 204 so as to make contact with the scribe arm 102 and provide for smooth movement of the scribe arm 102 through the channel 202.

In an alternate embodiment, the channels 202 and 204 are coated with a material having a low frictional coefficient to similarly provide for smooth movement of the alignment track 106 and/or scribe 102, as may be the case. Some examples of materials that may be used to reduce friction include Teflon™, nylon, and silicon. Additionally, lubricants such as Triflow™ or machine oil may also be used to provide for smooth movement.

The coupling unit 104, as well as alignment track 106 and scribe arm 102 may be made of any material that will provide sufficient rigidity and/or strength to allow for proper function of the scribe device 100. Some examples of materials that may be used either alone or in combination, include, but are not limited to, plastic, nylon, steel, aluminum, metal composite, carbon fiber and/or carbon composites.

Figure 3C:
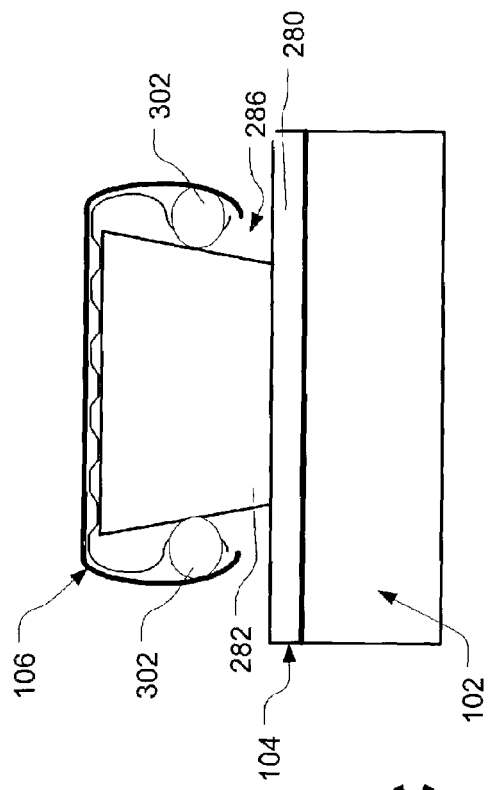
FIG. 3C and FIG. 3D are diagrams illustrating details of a further embodiment of channels 284 and 286.

FIG. 3C shows details of a further embodiment of alignment track 106. In this embodiment the channel 286 is configured to receive the cross member 282 of the coupling unit 104. The channel 286 includes bearings 302 to provide for smooth movement of between the alignment track 106 and the coupling unit 104.

Figure 3D:
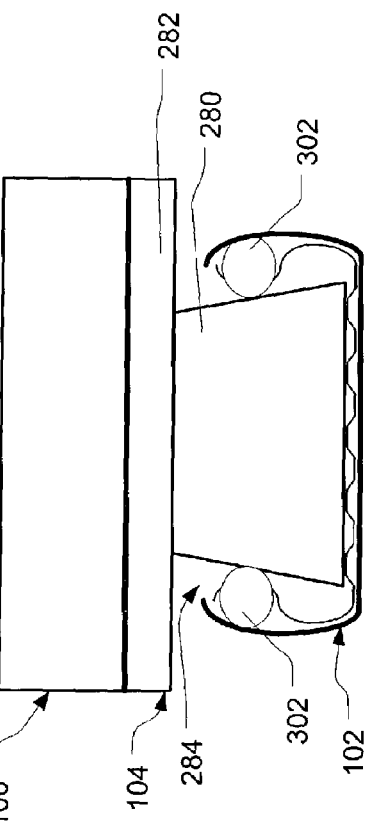

FIG. 3D shows details of a further embodiment of scribe arm 102. In this embodiment the channel 284 is configured to receive the cross member 280 of the coupling unit 104. The channel 284 includes bearings 302 to provide for smooth movement of between the scribe arm 102 and the coupling unit 104.

FIG. 4A and FIG. 4B are diagrams further illustrating embodiments of the shaping device 100. The coupling unit 104 is connected to the alignment track 106 and moveable along the alignment track in the X direction. The coupling unit 104 is fixed in position in both the Y and Z directions. The scribe arm 102 is connected to the coupling unit and moveable through a channel (not shown) of the coupling unit 104 in the Y direction. The scribe arm 102 is fixed in position in the Z and X directions.

With reference to FIG. 1C, FIG. 4A and FIG. 4B the guide 108 of the scribe arm 102 is placed in contact with a structure 55 (FIG. 1C). The coupling unit 104, and thus the scribe arm 102, is moved in the X direction along the alignment track 106 while the guide 108 is kept in contact with a structure 55. As the coupling unit 104 scribe arm 102 is moved in the X direction the scribe arm moves through a channel of the coupling unit 104 in the Y direction. The scribe point 112 is fixed on the scribe arm 102. As a result, as the scribe arm moves in the Y direction, so dos the scribe point 112. The scribe point 112 may be held in contact with a material while the coupling unit 104 is moved along the alignment track 106. As the scribe arm 102 moves in the Y direction, the scribe point 112 will etch a line in the material to which it is held in contact. FIG. 4B illustrates that the scribe point 112 may be positioned to extend in a direction opposite the fasteners 110 on alignment rack 106.

FIG. 4C shows a diagram illustrating a further embodiment of the present invention. In this embodiment, the scribe point 112 (FIG. 4A) is replaced with a cutting device 400. In one embodiment, cutting device 400 includes a motor 404 for powering a cutter 402. The cutter 402 may be, for example, a rotary cutter. Alternatively, the cutter 402 may be a reciprocating straight blade and the motor 404 may be a reciprocating motor.

Figure 5A:
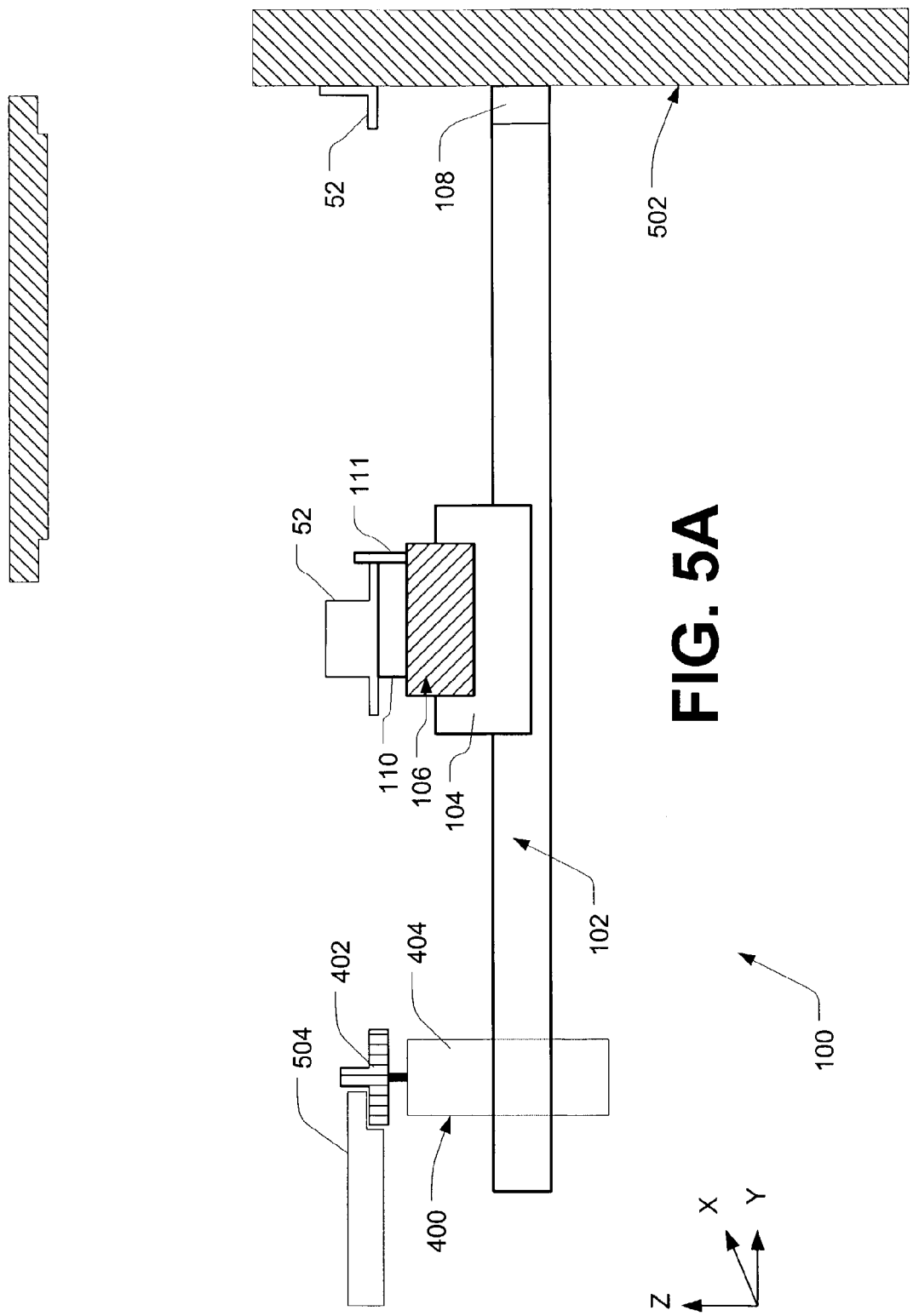
FIG. 5A is a diagram illustrating the shaping device 100 configured to cut a ceiling tile to conform to a known wall 502.

FIG. 5A is a diagram illustrating the shaping device 100 set up for cutting a ceiling tile to accommodate an abutting wall 502. The shaping device is attached to a ceiling support cross member 52 of a ceiling support structure 50 (FIG. 1C). The shaping device is connected via fasteners 110. Where the ceiling support cross member 52 is metal, it is preferable that the fastener 110 be configured as magnet. The coupling unit 104, and thus the scribe arm 102, are moved in the X direction along the alignment track 106 while the guide 108 is kept in contact with the wall 502. The cutting device 400 is fixed on the scribe arm 102. As a result, as the scribe arm 102 moves in the Y direction, so does the cutting device 400, and the cutter 402. The cutter 402 may be held in contact with a material 504, such as an acoustical ceiling panel while the coupling unit 104 is moved along the alignment track 106. In one embodiment, the acoustical ceiling tile may be supported in place by the ceiling support cross members 52 of a ceiling support structure 50. As the scribe arm 102 moves in the Y direction, the cutter 402 will cut the material 504 in a line that corresponds to the line that is traveled by the guide 108 as the coupling unit 104 is moved along the alignment track. This line will substantially correspond to the curve of the wall 502, thus yielding a ceiling tile that will fit against the wall 502. It can be seen that alignment stop 111 abuts the ceiling support cross member 52 thereby limiting the movement of the alignment track 106 in the Y direction away from the wall structure 502.

Figure 5B:
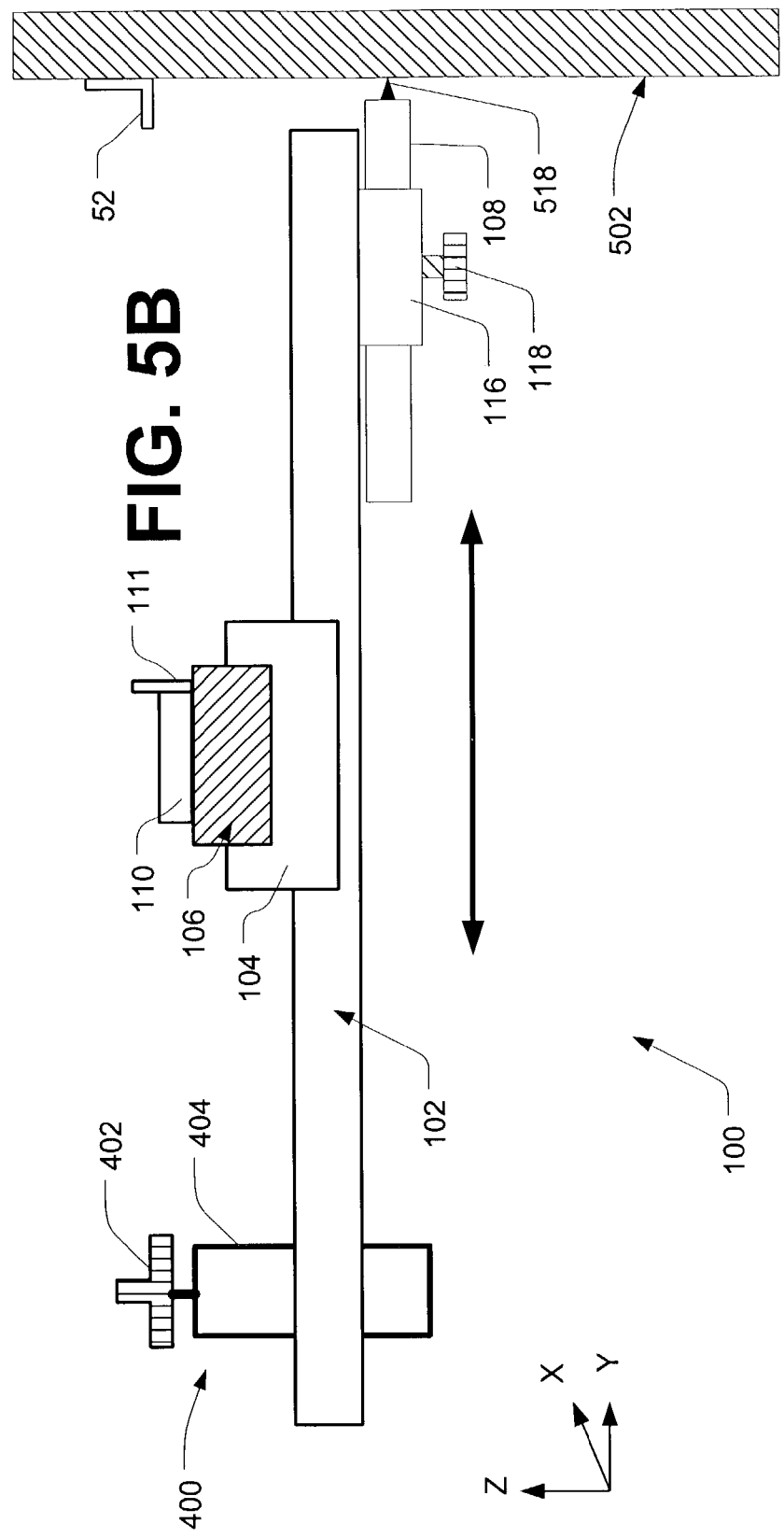
FIG. 5B is a diagram illustrating an embodiment of guide 108 configured to include a guide tip 518.

FIG. 5B illustrates a further embodiment of guide 108. In this embodiment guide 108 is movable connected to the scribe arm 102 by a mount 116 and thumbscrew 118. The guide 108 incorporates a tip 518. Guide tip 518 is configured to physically contact the wall structure 502.

FIG. 5C illustrates a further embodiment of the guide 108. In this embodiment, the guide 108 is configured to include a guide riser 550. Guide riser 550 is preferably configured to be aligned substantially perpendicular to the length of the guide 108. Guide riser 550 is preferably long enough to allow it to reach and make contact with, for example, a ceiling cross member 52 of a ceiling support structure 50.

FIG. 5D is a diagram illustrating a further embodiment of the guide 108. In this embodiment, the guide riser 550 is configured to include guide rollers 555. The guide rollers 555 are preferably configured to be rotatable about the axis defined by the guide riser 550. The guide rollers 555 are placed on the guide riser 550 so as to allow, for example, enough space for a ceiling cross member 52 to fit between the guide rollers 555. As the coupling unit 104 moves in the X direction along the alignment track 106, the guide rollers help keep the guide 108 level relative to the ceiling cross member 52.

FIG. 5E is a diagram illustrating a further embodiment of the guide 108. In this embodiment, the guide 108 is configured to include a roller ball tip 575. The roller ball tip may be made of any material, including, for example, nylon, steel, plastic, carbon fiber. The roller ball tip 575 is configured to contact and be freely rotatable in relation to the wall structure 502.

Figure 6A:
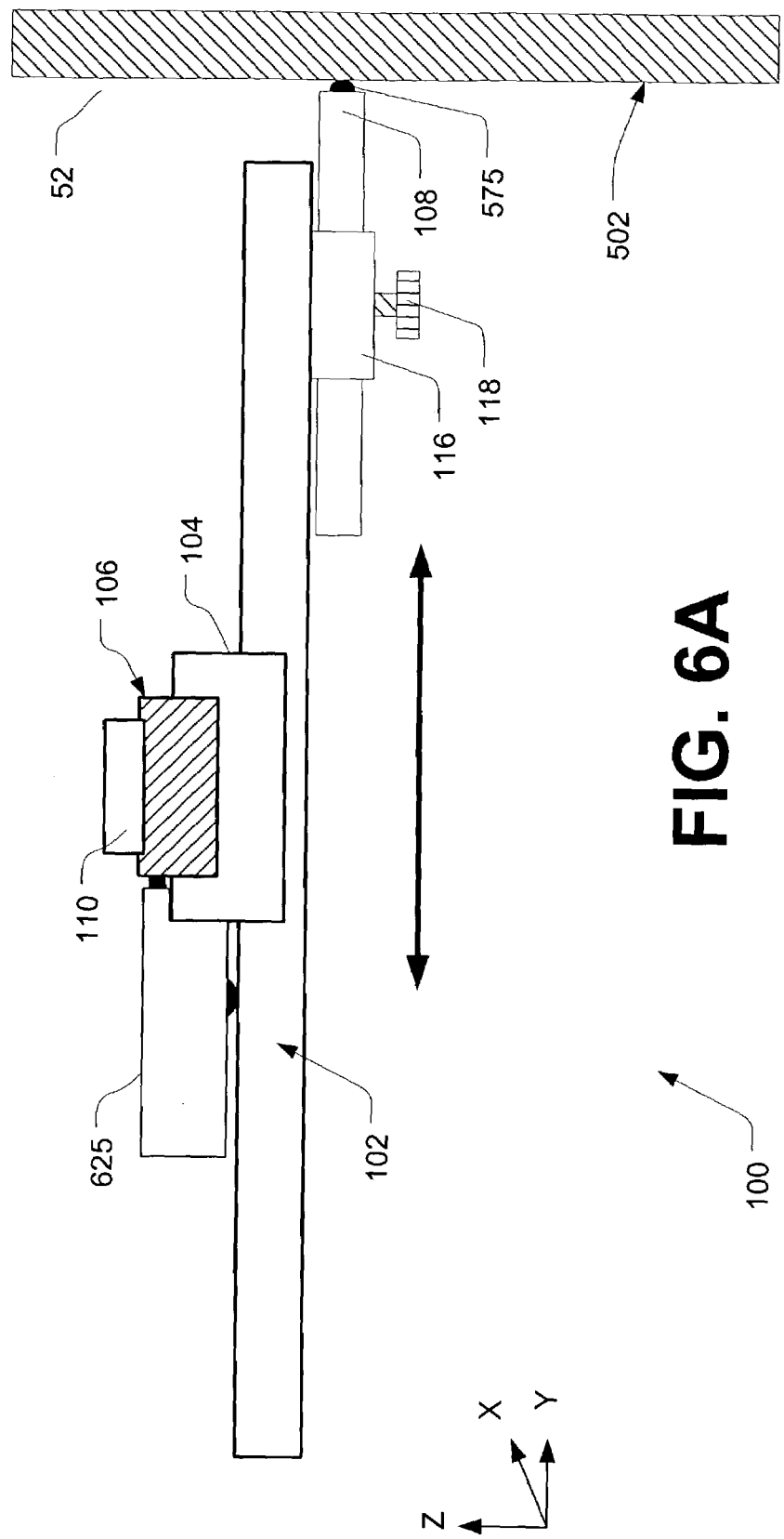
FIG. 6A is a diagram illustrating an embodiment of scribing device 100 configured to include a position-sensing unit 625.

FIG. 6A is a block diagram illustrating a further embodiment of the scribing device 100. In this embodiment, the shaping device 100 is configured to include a position sensor unit 625. Position sensor unit 625 is configured to generate and output a signal Z representative of the movement (X') of the coupling device 104 in the X direction and the movement (Y') of the scribe arm 102 in the Y direction.

Figure 6B:
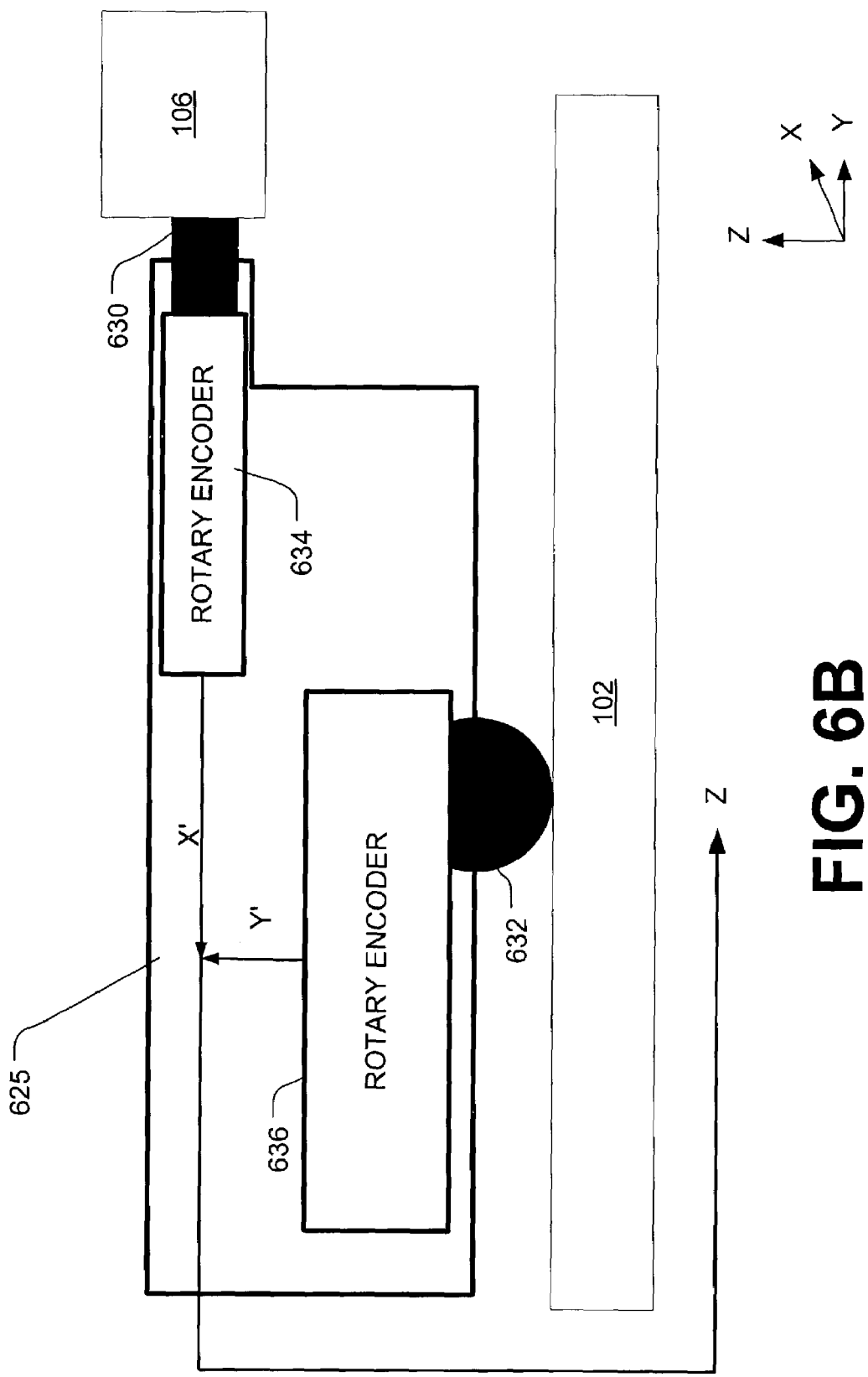
FIG. 6B is a diagram illustrating an embodiment of position sensing unit 625.

FIG. 6B is a diagram illustrating details of one embodiment of sensor unit 625. In this example, the sensor unit 625 includes a rotary encoder 634 and a rotary encoder 636. Rotary encoder 634 includes a roller 630 that makes physical contact with the alignment track 106. As the coupling unit 104 (not shown), and thus the scribe arm 102, is moved along the alignment track 106 in the X direction, the roller 630 rotates thus causing the rotary encoder to output a signal X' indicative of the movement of the scribe arm in the X direction. Similarly, the rotary encoder 636 includes a roller 632 that makes physical contact with the scribe arm 102. As the scribe arm moves in the Y direction the roller 632 rotates and cause the rotary encoder to output a signal Y' indicative of the movement of the scribe arm in the Y direction. Collectively, these signals X' and Y' may be output as position signal Z.

Figure 6C:
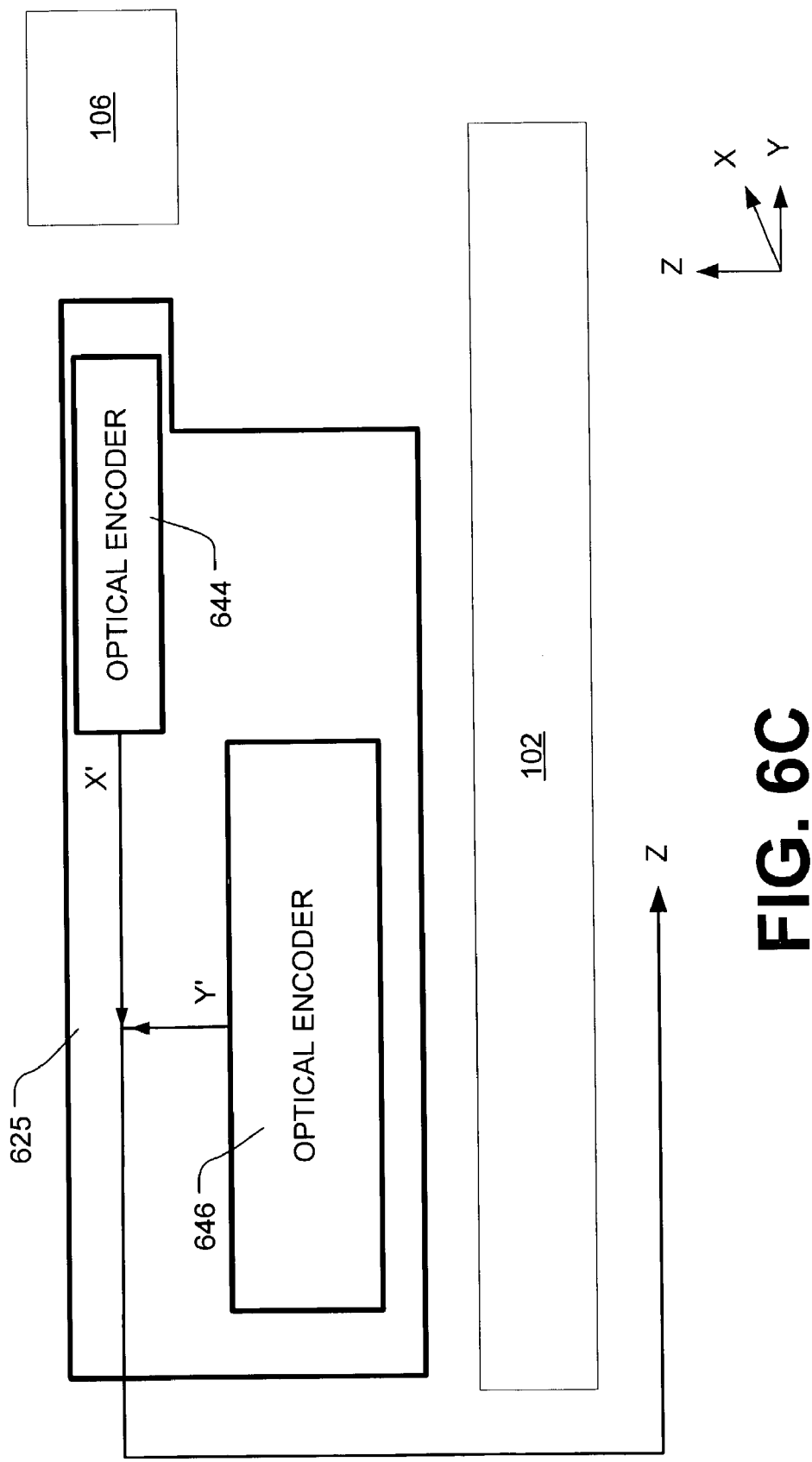
FIG. 6C is a diagram illustrating a further embodiment of position sensing unit 625.

FIG. 6C is a diagram illustrating details of a further embodiment of sensor unit 625. In this embodiment, an optical encoder 646 is provided for optically monitoring a surface associated with the scribe arm 102 and outputting a signal Y' representative of the movement of the scribe arm 102 in the Y direction. Similarly, an optical encoder 644 is provided for optically monitoring a surface associated with the alignment track 106 and outputting a signal X' representative of the movement of the scribe arm 102 in the Y direction.

FIG. 6D provides further details of an embodiment of an optical encoder 646. In this illustration it can be seen that the optical encoder 646 includes a light source 650, a lens element 654 and a photodetector 652. The light source 650 emits a beam of light J that is directed thru the lens element 654 and onto a surface 656 associated with, in this example, the scribe arm 102. The light beam J is reflected from the surface 656 and back thru the lens element 654 where it then hits the photodetector 652. In response the photodetector 652 generates an output signal Y' indicative of the movement of the scribe arm 102 in the Y direction.

FIG. 6E shows a diagram illustrating a surface 656 that is optically monitored by the optical encoder 646. In this example, the surface 656 is a surface edge of the scribe arm 102. The surface edge 656 includes a series of index marks 658. These marks are preferably equally or otherwise uniformly placed on the surface edge 656. As the scribe arm 102 moves in the Y direction the light beam J from optical encoder 646 is reflected from the surface 656. The index marks 658 cause the light beam to be reflected differently thus causing the light beam J reflected onto the photodetector 652 to change. These changes will correspond to index marks passing under the light beam J as the scribe arm 102 is moved in the Y direction. Such changes will be detected by the photodetector and the output signal Y' will be correspondingly changed to indicate the movement of the scribe arm 102 in the Y direction (and thus the distance of the wall structure 502 from the scribe device 100). It will be noted that optical encoder 644 may also be configured like optical encoder 646.

Figure 6F:
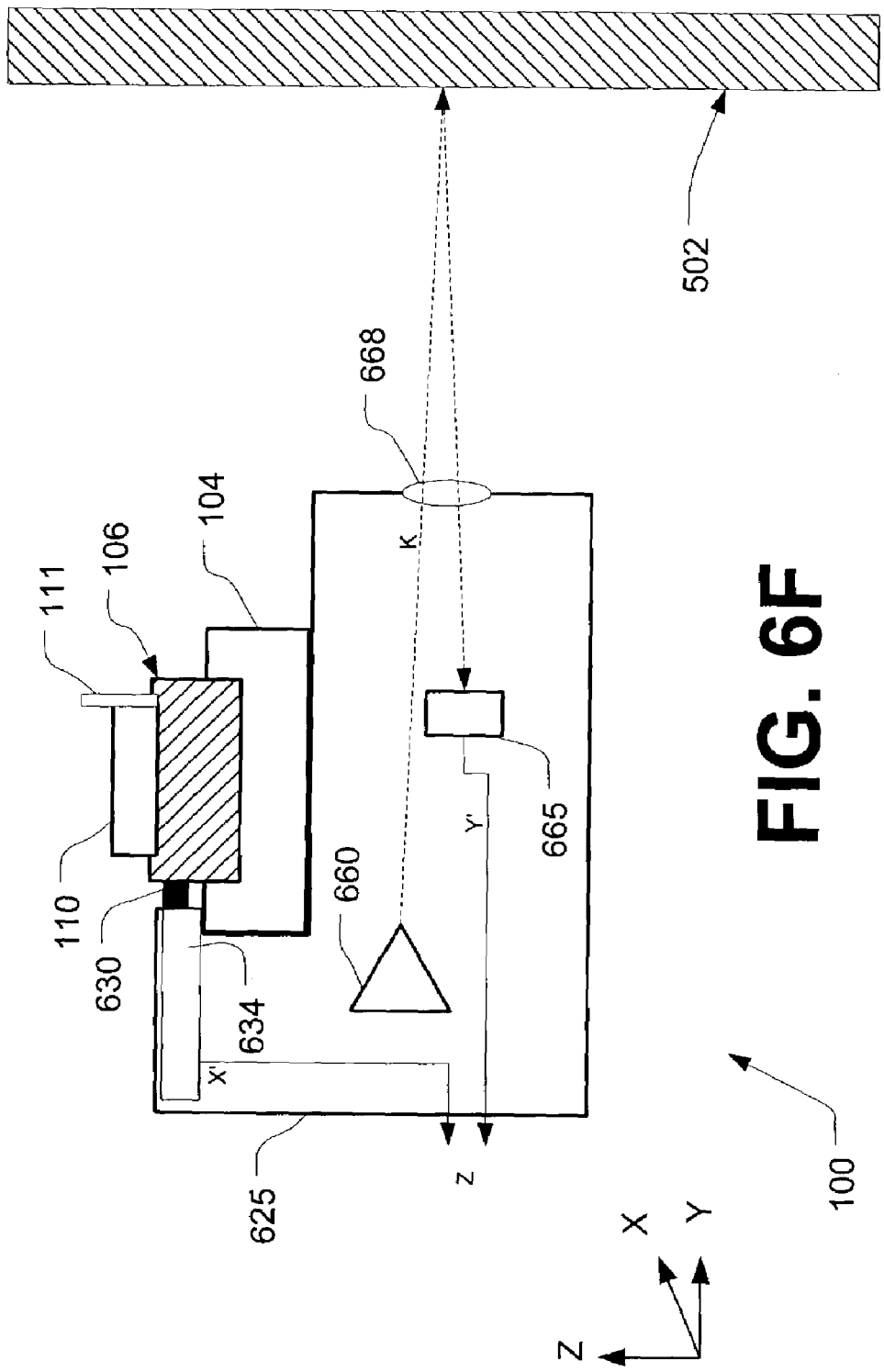
FIG. 6F is a diagram illustrating a further embodiment of a scribe device 100 in which position-sensing unit 625 is configured to measure the distance to a surface.

FIG. 6F is a diagram illustrating a further embodiment of scribing device 100. In this embodiment, the position sensor unit 625 is configured to replace the scribe arm 102 (FIG. 6A). The position sensor 625 is configured to optically monitor the wall surface 502 and to generate a signal Y' indicative of the distance of the wall structure 502 from the scribe device 100. In this embodiment, a light source 660 is provided for generating and emitting a light beam K. A lens element 668 is provided for focusing the light beam K onto a structure, such as, for example, wall structure 502. The light beam K is reflected from the wall structure 502 and received by the distance calculator 665, which includes a photodetector that is responsive to the light beam K. Based upon the time for the light beam K to be emitted and returned to the distance calculator 665, a determination is made as to how far the wall structure 502 is from the scribe device 100. This information is output as a signal Y' indicative of the distance of wall structure 502 from the scribing device 100. FIG. 6G is a diagram further illustrating the scribing device 100 of FIG. 6F.

Figure 6H:
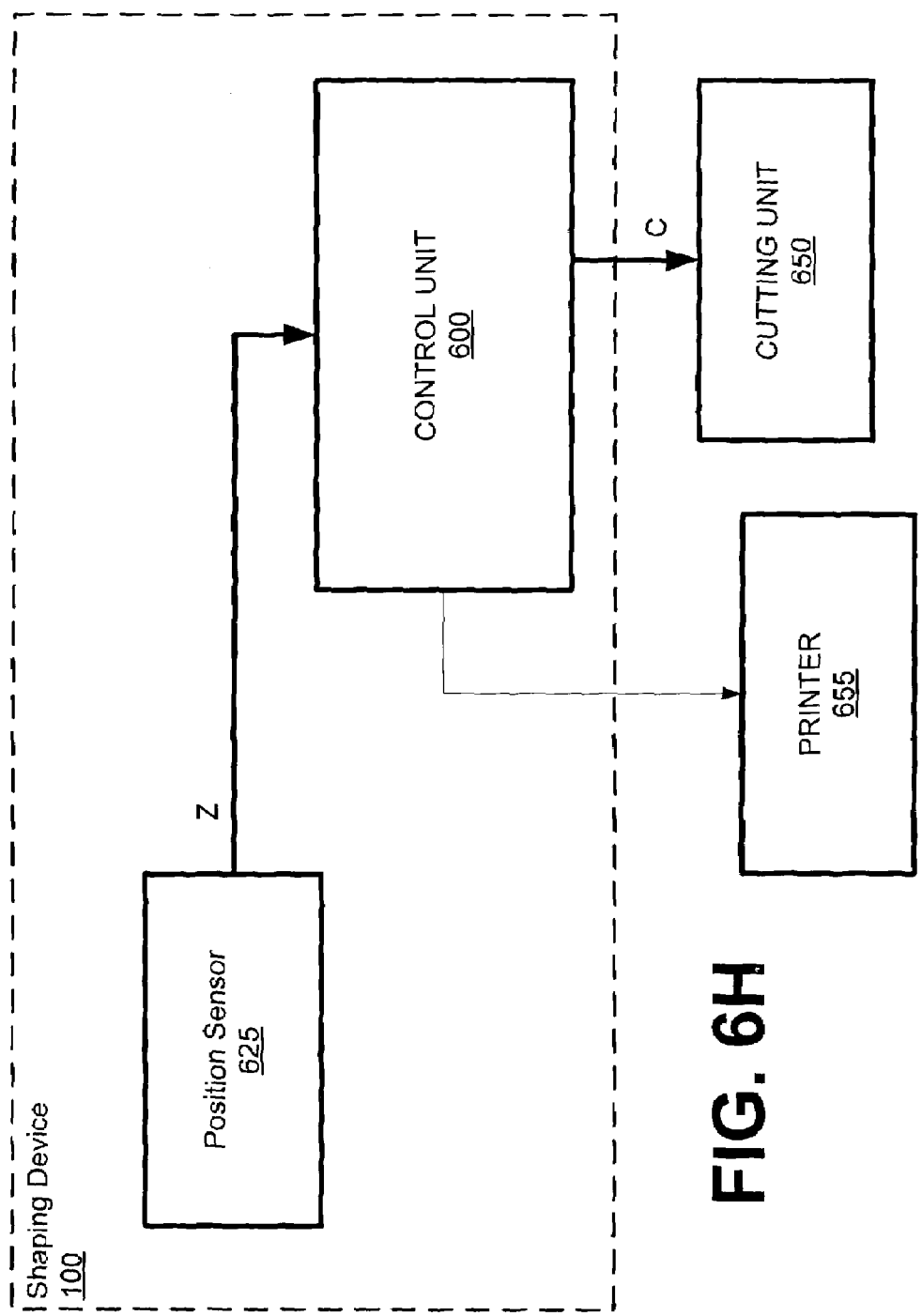
FIG. 6H is a block diagram illustrating a further embodiment of the scribing device 100.

FIG. 6H illustrates a further embodiment of the scribe device 100. In this embodiment, the scribing device 100 includes a control unit for receiving the signal Z from a position sensor 625. The signal Z may be transmitted to a control unit 600 via a wired or wireless interface. The control unit 600 may be incorporated into the same package as the position sensor 625, or may be a separate unit that receives data from the position sensor via a wired or wireless connection. The control unit 600 may be configured to include memory to store data representing the signal Z. The control unit 600 may also be configured to store representing the signal Z to remote memory associated with and accessible by the control unit 600. Alternatively, the control unit 600 may be configured to generate a control signal C to control a cutting unit 650. Based upon the control signal C, the cutting unit 650 will cause, for example, a tile to be cut to a shape that corresponds to the curve/line represented by the signal Z received from the position sensor 625 of scribing device 100.

Figure 7:
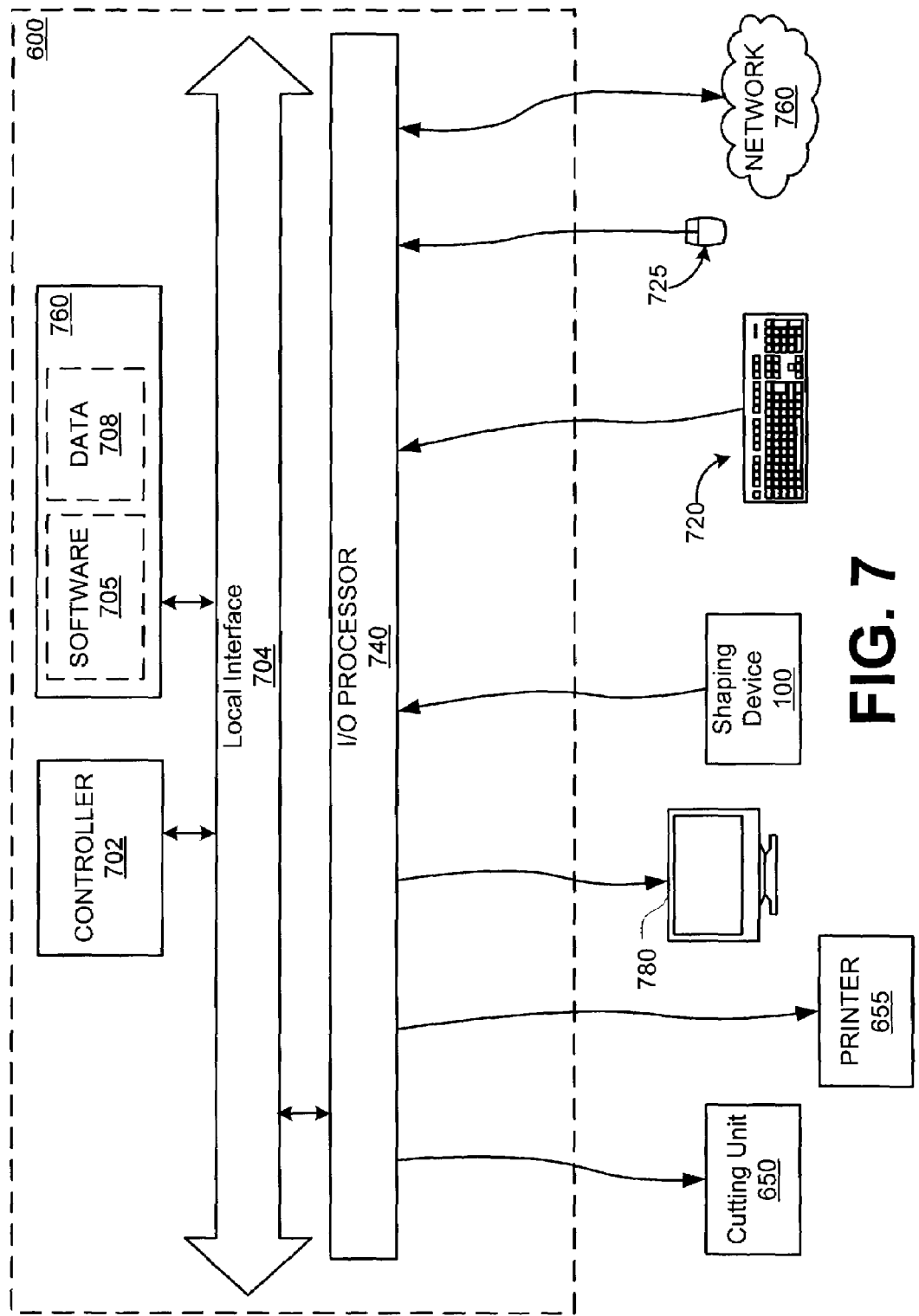
FIG. 7 is a block diagram illustrating an embodiment of a control unit 600.

FIG. 7 is a block diagram illustrating an embodiment of control unit 600. In this embodiment, control unit 600 includes a controller 702 and memory storage 760. Memory storage 760 may include memory for storing software 705 as well as data 708. Memory storage 760 may be configured to include memory for storing data. Data 708 may include, among other things, data representing a curve of a known structure. Data may also be stored on other memory associated with the control unit 600 and accessible thereby via, for example, a network 760.

Software 705 may include operational software for causing the various functions and operations of control unit 600 to be carried out. A local interface 704 is provided for transferring instructions and data between controller 702 and memory 760. Local interface 704 provides a conduit for transfer of electronic instructions and data from/to the input/output (I/O) processor 740. I/O processor 740 includes provisions for receiving data from, for example, a keyboard 720 and pointing device 725. I/O processor 740 is also configured to connect the control unit 600 to a network 720, as well as outputting data for display on a display device 760. I/O processor may also be configured to interface directly with shaping device 100. Alternatively, the control unit 600 may interface with the shaping device via network 760.

The control unit 600 can be implemented in hardware, software, firmware, or a combination thereof. In the preferred embodiment(s), the control unit 600 is implemented in hardware and firmware that is stored in a memory and that is executed by a suitable instruction execution system. If implemented in hardware, as in an alternative embodiment, the control unit 600 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The controller 702 may be implemented as a typical commercially available processor. Examples of commercially available processors include, but are not limited to, a Pentium microprocessor from Intel Corporation, Power PC microprocessor, SPARC processor, PA-RISC processor or 68000 series microprocessor. Many other suitable processors are also available. Such a processor typically executes a program, referred to as an operating system, which may be stored as software 705. Examples of commercially available operating systems include, but are not limited to, various versions of the Windows operating systems from Microsoft Corporation, the Net Ware operating system available from Novell, Inc., or the Unix operating system available from many vendors such as Sun Microsystems, Inc., Hewlett-Packard and AT&T. The operating system controls the execution of computer programs employed by the present invention, such as the graphical user interface (GUI) and the signal scaling system, and provides scheduling, input-output control, file and data management, memory management, and communication control and related services. The functional elements of the evaluation system 300 communicate with each other via local interface 604.

The software program(s) 705, which comprises a listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

The invention claimed is:

1. A scribing device comprising:
   Alignment track;
   connector for connecting said alignment track to an overhead ceiling tile support frame;
   alignment stop to limit the movement of the alignment track relative to the ceiling tile support frame;
   scribe arm;
   coupling unit for coupling said scribe arm to said alignment track at a predetermined angle relative to said alignment track;
   sensor unit for outputting a position signal representative of the position of said scribe arm; and
   controller for receiving said position signal and causing a control signal to be generated and output.

2. The device of claim 1 wherein said sensor unit comprises an optical encoder.

3. The device of claim 1 wherein said sensor unit comprises a rotary encoder.

4. The scribing device of claim 1 further comprising a cutting unit that is responsive to said control signal from said controller.

5. The scribing device of claim 1 wherein said connector comprises a magnet.

6. A scribing device comprising:
   alignment track;
   connector for connecting said alignment track to a predetermined overhead surface;
   laser unit;
   coupling unit for coupling said laser unit to said alignment track at a predetermined angle relative to said alignment track;
   sensor unit for outputting a position signal representative of the position of said laser unit; and
   said laser unit is configured to determine the distance between a predetermined point and a predetermined structure.

7. The scribing device of claim 6 wherein said connector comprises a magnet.

8. A scribing device comprising:
   alignment track;
   scribe arm;
   coupling unit for coupling said scribe arm to said alignment track at a predetermined angle relative to said alignment track;
   connector for attaching said alignment track to an overhead ceiling tile support frame and
   alignment stop for limiting the movement of the alignment track relative to the ceiling tile support frame.

9. The device of claim 8 wherein said scribe-arm is moveably attached to said coupling unit so as to be movable in a direction substantially perpendicular to said alignment track.

10. The device of claim 8 wherein said scribe arm further comprises a scribe point.

11. The device of claim 10 wherein said scribe point comprises a scorer.

12. The device of claim 10 wherein said scribe arm further comprises a guide point for making contact with a structure.

13. The device of claim 12 wherein said scribe point is positioned along said scribe arm so that said alignment track is located between said scribe point and said guide point.

14. The device of claim 10 wherein said scribe point comprises a rotary cutter.

15. The device of claim 10 wherein said scribe point is positioned along said scribe arm so that said scribe point is located between said alignment track and said guide point.

16. The device of claim 8 wherein said coupling unit comprises a first channel for receiving said scribe arm and a second channel for receiving said alignment track.

17. The device of claim 16 wherein said first channel comprises a bearing assembly to allow smooth movement of said scribe arm through said first channel.

18. The device of claim 17 wherein said second channel comprises a bearing assembly to allow smooth movement of said alignment track through said second channel.

19. The device of claim 8 wherein said connector comprises a magnet.

20. The device of claim 8 wherein said alignment track comprises a first channel for receiving said coupling unit.

21. The device of claim 20 wherein said scribe-arm comprises a second channel for receiving said coupling unit.

22. The device of claim 21 wherein said coupling unit comprises a first flange and a second flange.

23. The device of claim 22 wherein said first channel comprises a bearing assembly to allow smooth movement of said coupling unit through said first channel.

24. The device of claim 22 wherein said second channel comprises a bearing assembly to allow smooth movement of said coupling unit through said second channel.

25. A scribing device comprising:
   alignment track;
   connector for connecting said alignment track to a predetermined overhead surface;
   scribe arm comprising a scribe point and a guide point;
   said scribe arm is movably attached to a coupling unit so as to be movable in a direction substantially perpendicular to said alignment track;
   said coupling unit is configured to couple said scribe arm to said alignment track at a predetermined angle relative to said alignment track;
   said coupling unit is moveable along said alignment track; and
   said connector comprises a magnet and an alignment stop.

* * * * *